Sept. 7, 1965        B. T. HOWES ETAL        3,204,406

COOLING SYSTEM FOR A RE-EXPANSION GAS TURBINE ENGINE

Original Filed April 4, 1960        24 Sheets-Sheet 1

BENJAMIN T. HOWES
IVAN M. SWATMAN
INVENTORS

BY John P. Faulkner
Keith L. Zerschling

ATTORNEYS

Sept. 7, 1965   B. T. HOWES ETAL   3,204,406
COOLING SYSTEM FOR A RE-EXPANSION GAS TURBINE ENGINE
Original Filed April 4, 1960   24 Sheets-Sheet 2

BENJAMIN T. HOWES
IVAN M. SWATMAN
INVENTORS

BY
ATTORNEYS

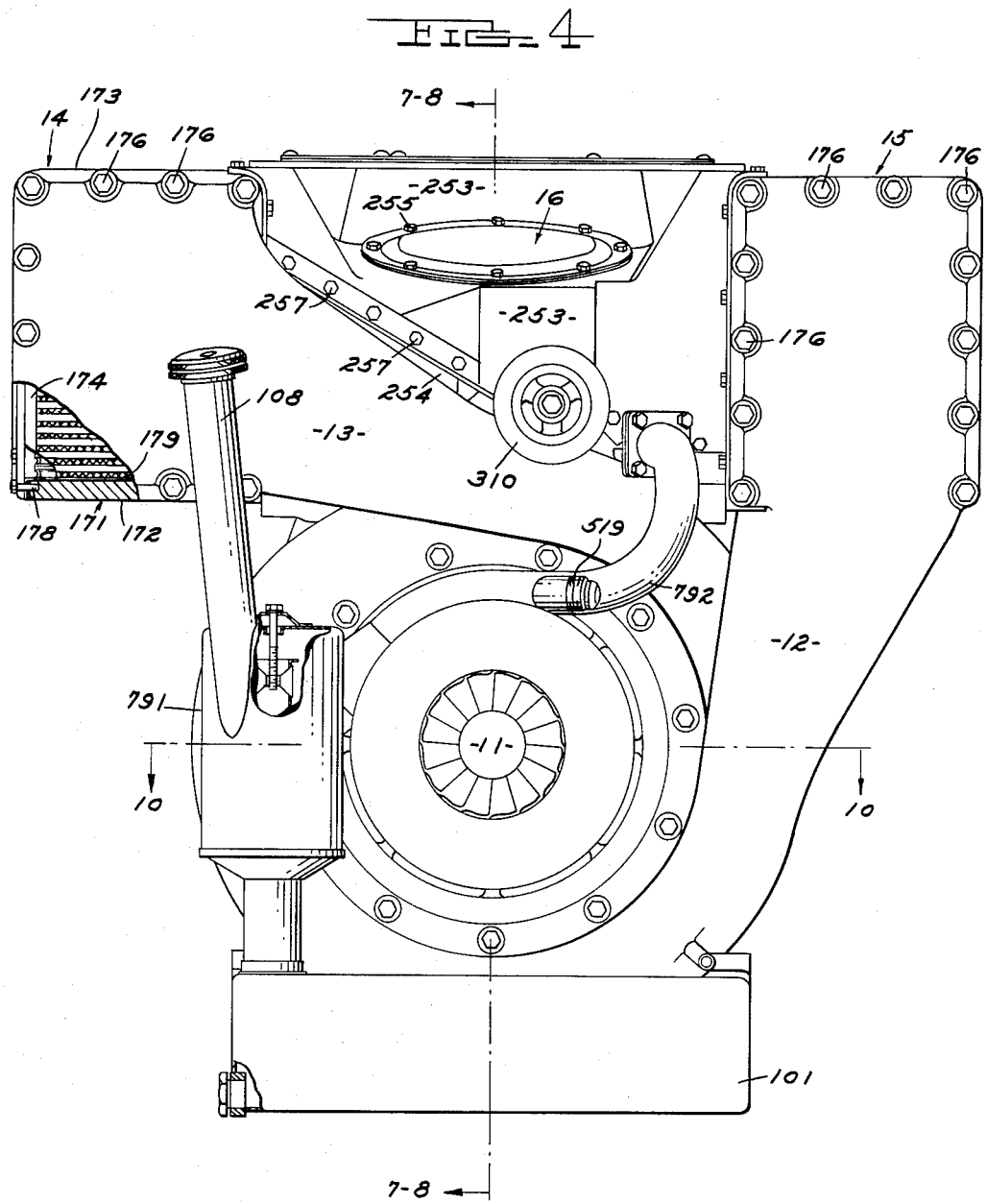

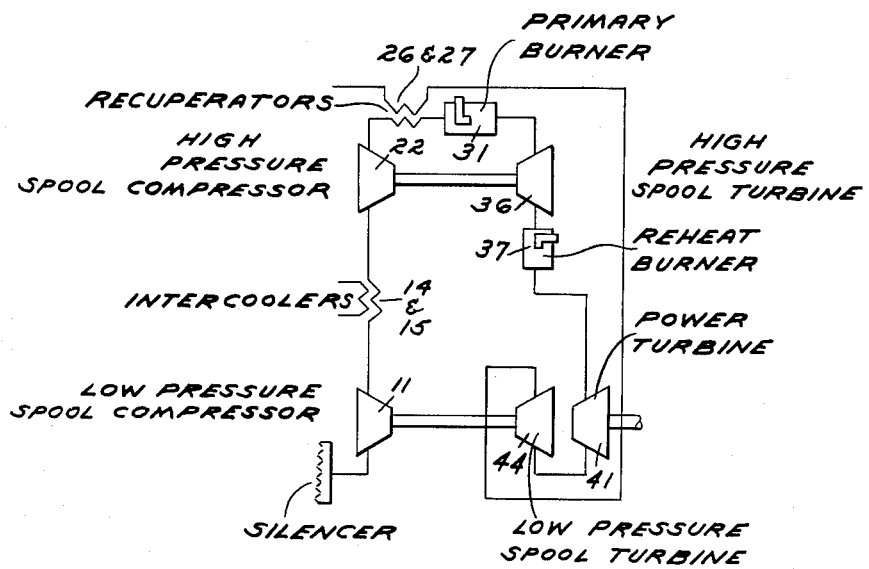
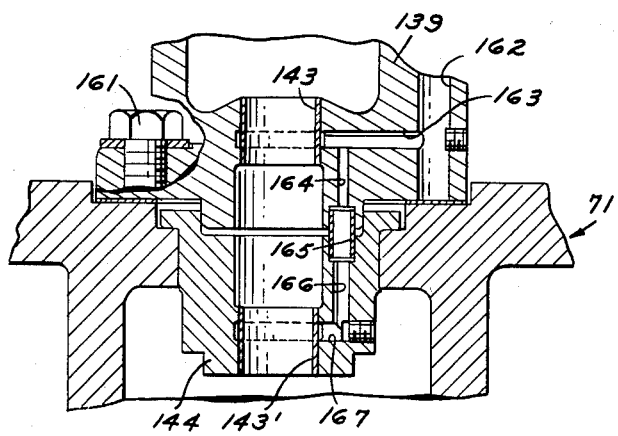

Sept. 7, 1965  B. T. HOWES ETAL  3,204,406
COOLING SYSTEM FOR A RE-EXPANSION GAS TURBINE ENGINE
Original Filed April 4, 1960  24 Sheets-Sheet 5

BENJAMIN T. HOWES
IVAN M. SWATMAN
INVENTORS

BY John R. Faulkner
Keith L. Gerschling

ATTORNEYS

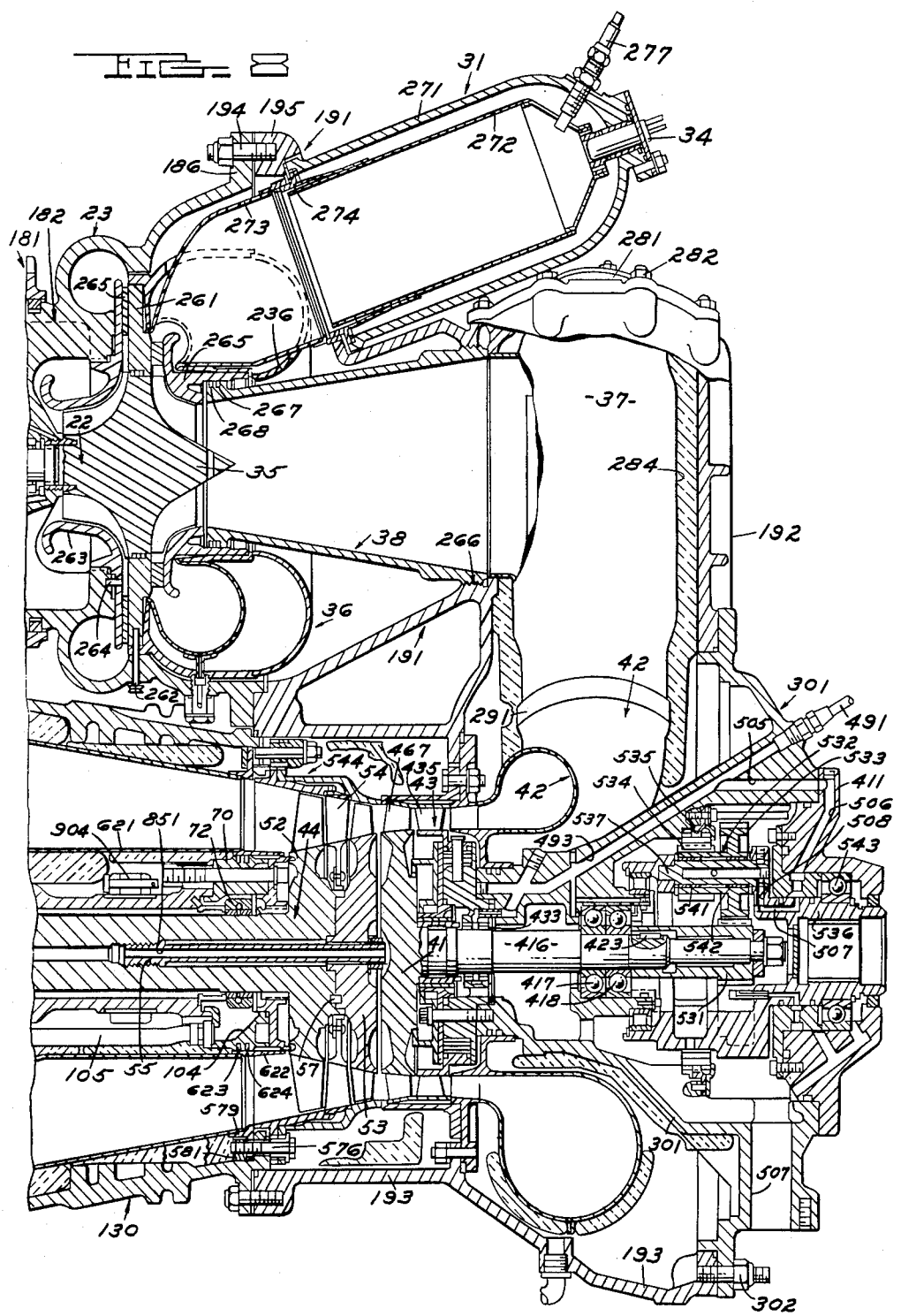

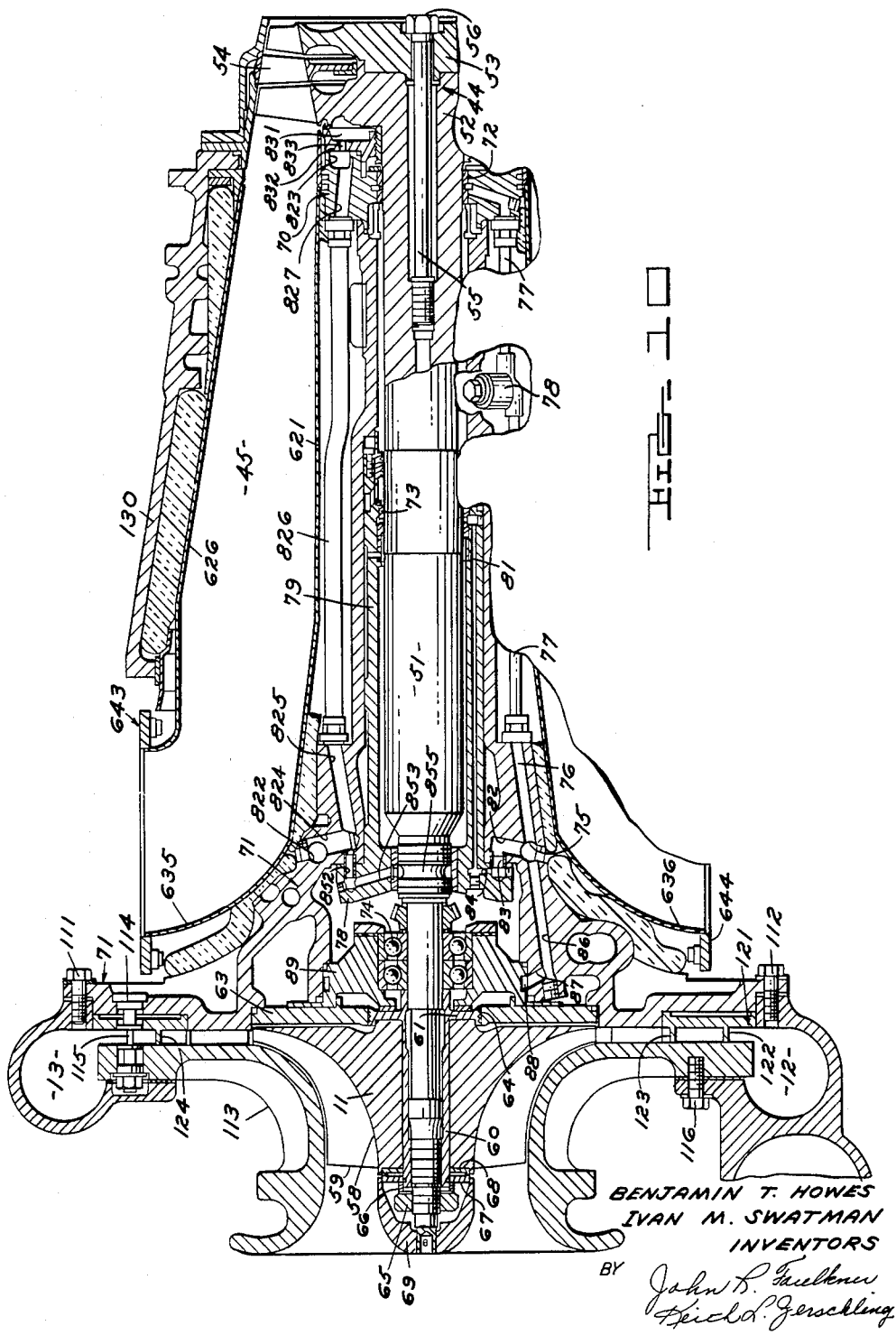

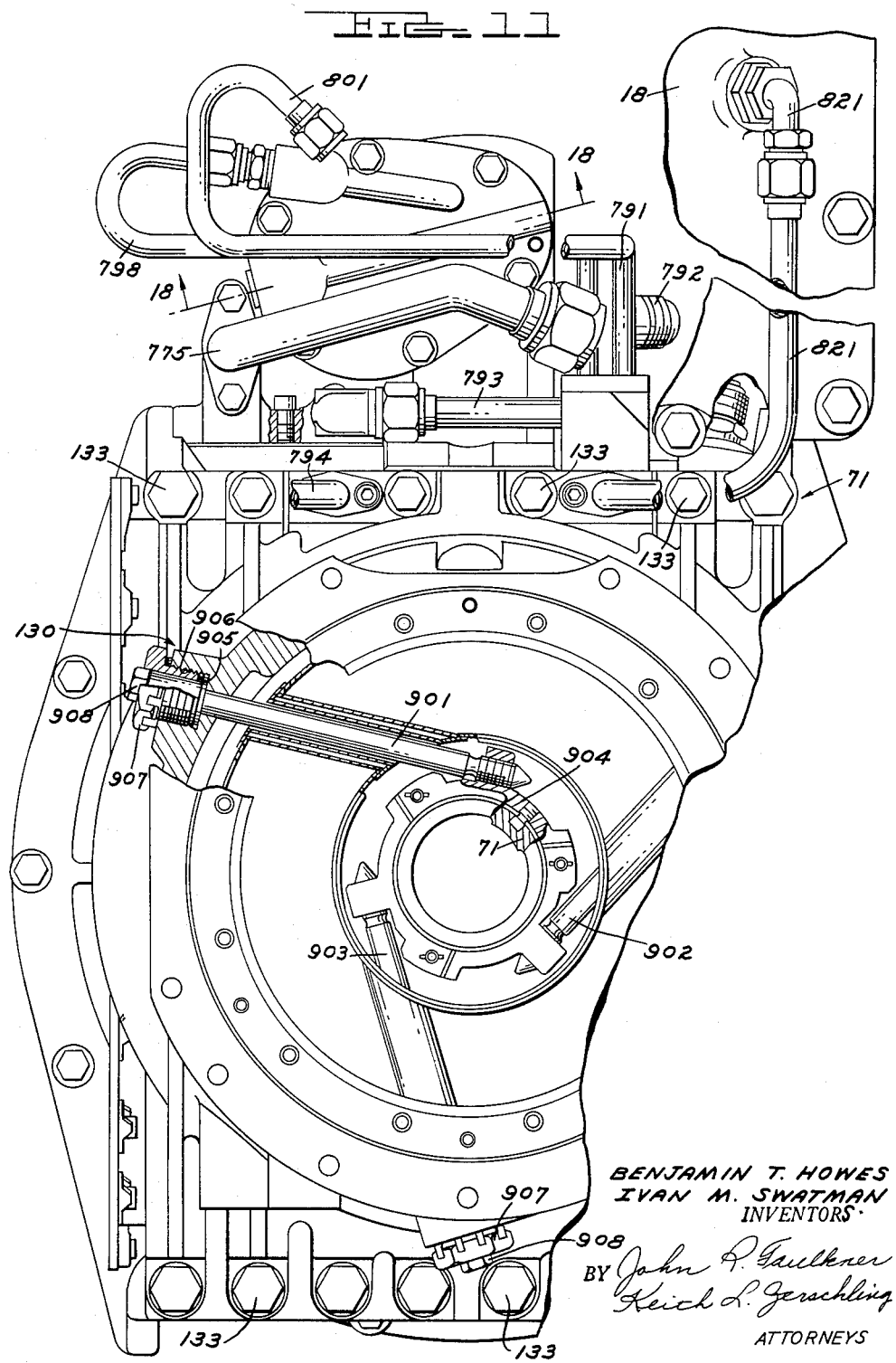

Sept. 7, 1965   B. T. HOWES ETAL   3,204,406
COOLING SYSTEM FOR A RE-EXPANSION GAS TURBINE ENGINE
Original Filed April 4, 1960   24 Sheets-Sheet 10
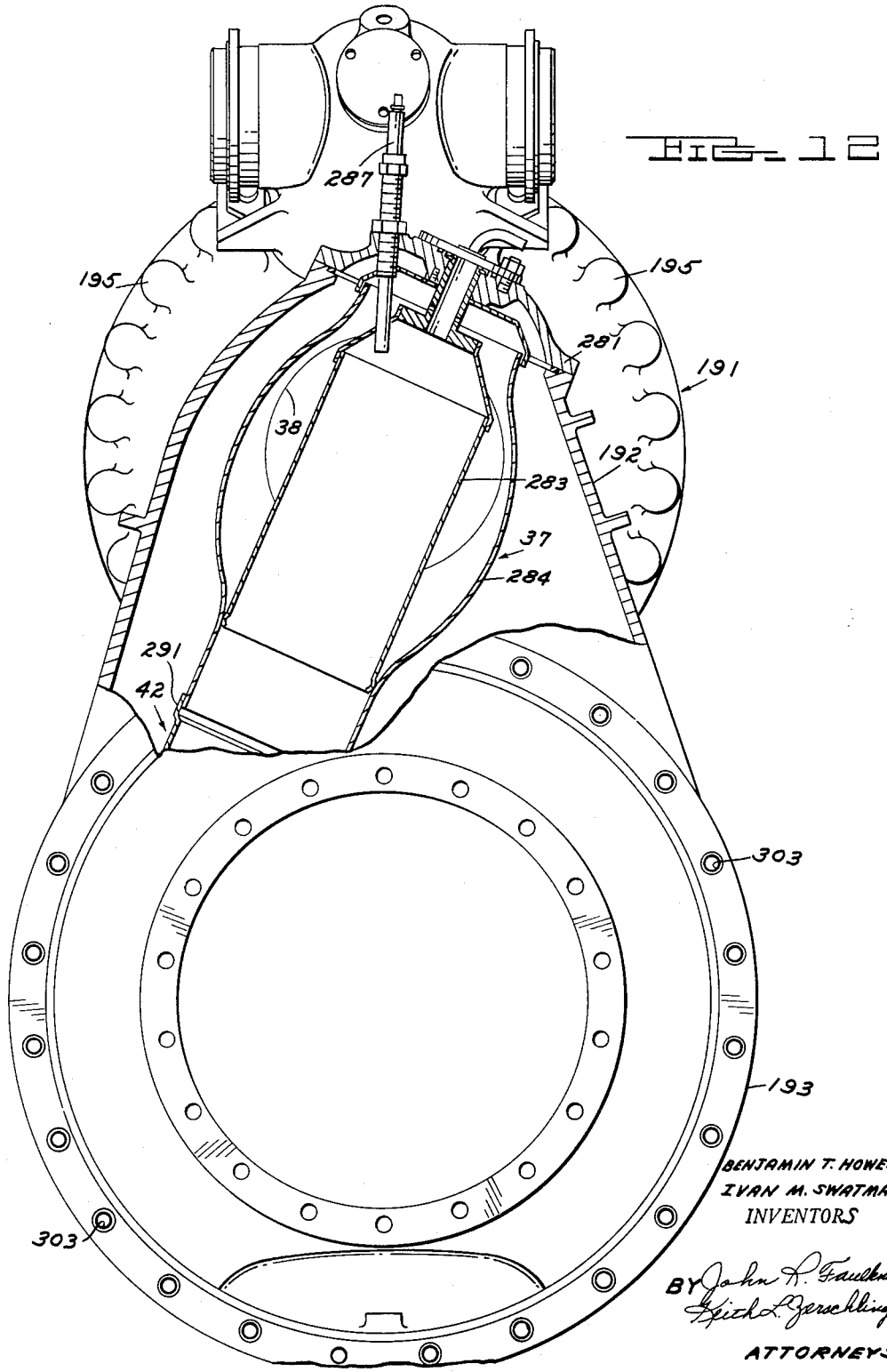
BENJAMIN T. HOWES
IVAN M. SWATMAN
INVENTORS
BY John R. Faulkner
Keith L. Jerschling
ATTORNEYS

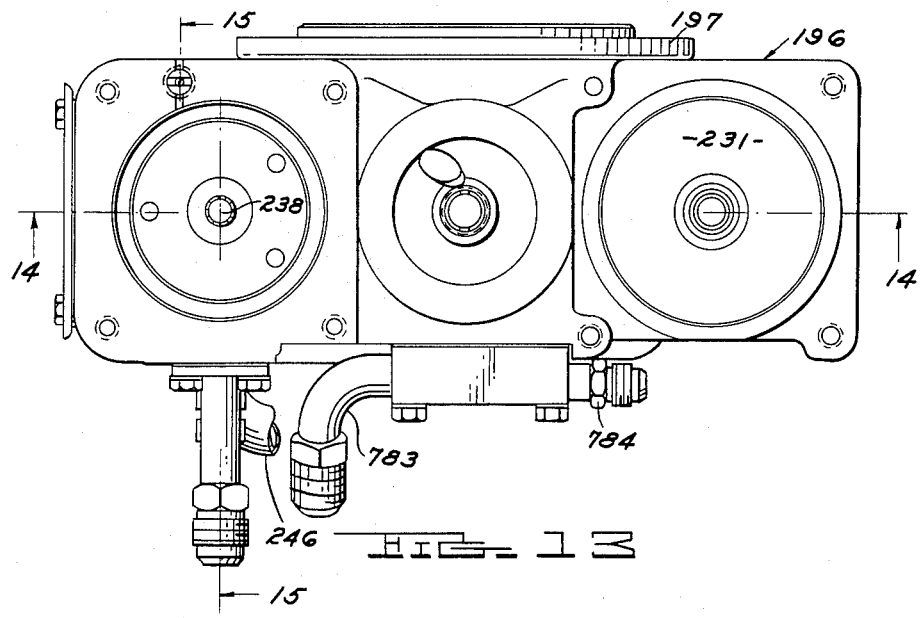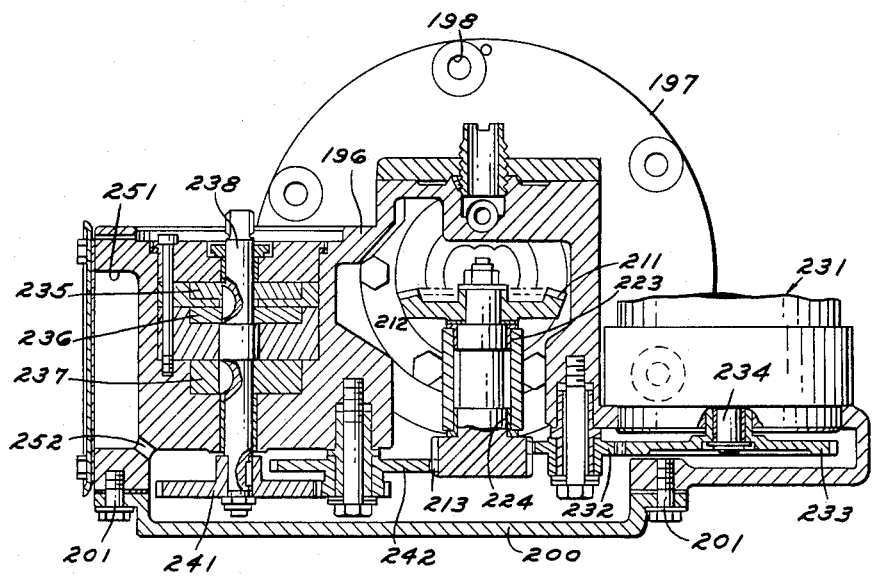

Sept. 7, 1965 B. T. HOWES ETAL 3,204,406
COOLING SYSTEM FOR A RE-EXPANSION GAS TURBINE ENGINE
Original Filed April 4, 1960 24 Sheets-Sheet 12
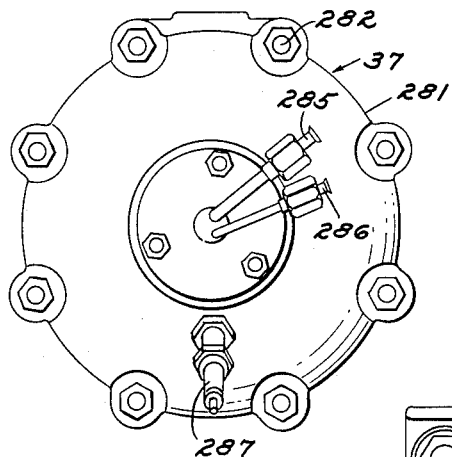
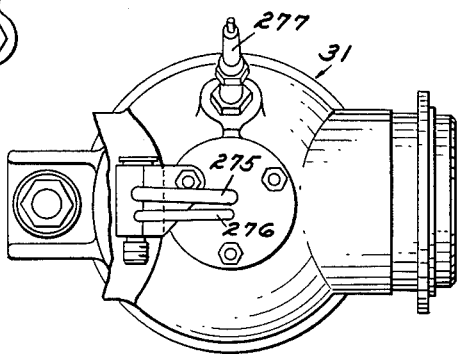
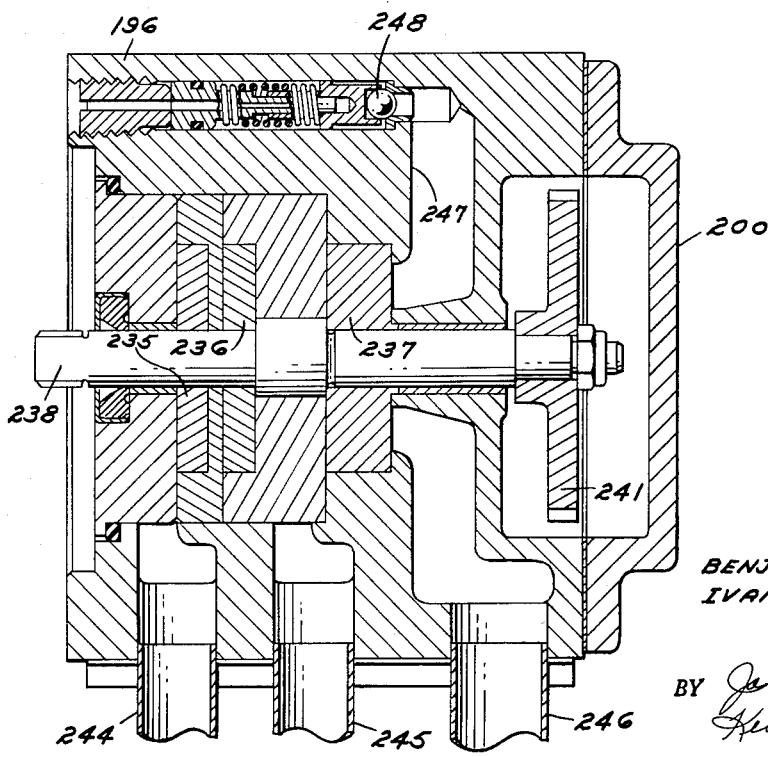
BENJAMIN T. HOWES
IVAN M. SWATMAN
INVENTORS
BY John R. Faulkner
Keith L. Zerschling
ATTORNEYS Sept. 7, 1965 B. T. HOWES ETAL 3,204,406
COOLING SYSTEM FOR A RE-EXPANSION GAS TURBINE ENGINE
Original Filed April 4, 1960 24 Sheets-Sheet 13

BENJAMIN T. HOWES
IVAN M. SWATMAN
INVENTORS

BY John L. Faulkner
Keith L. Zerschling
ATTORNEYS

Sept. 7, 1965    B. T. HOWES ETAL    3,204,406
COOLING SYSTEM FOR A RE-EXPANSION GAS TURBINE ENGINE
Original Filed April 4, 1960    24 Sheets-Sheet 17

BENJAMIN T. HOWES
IVAN M. SWATMAN
INVENTORS

BY John A. Faulkner
Keith L. Zerschling

ATTORNEYS

BENJAMIN T. HOWES
IVAN M. SWATMAN
INVENTORS

BENJAMIN T. HOWES
IVAN M. SWATMAN
INVENTORS

BY John L. Faulkner
Keith L. Zerschling
ATTORNEYS

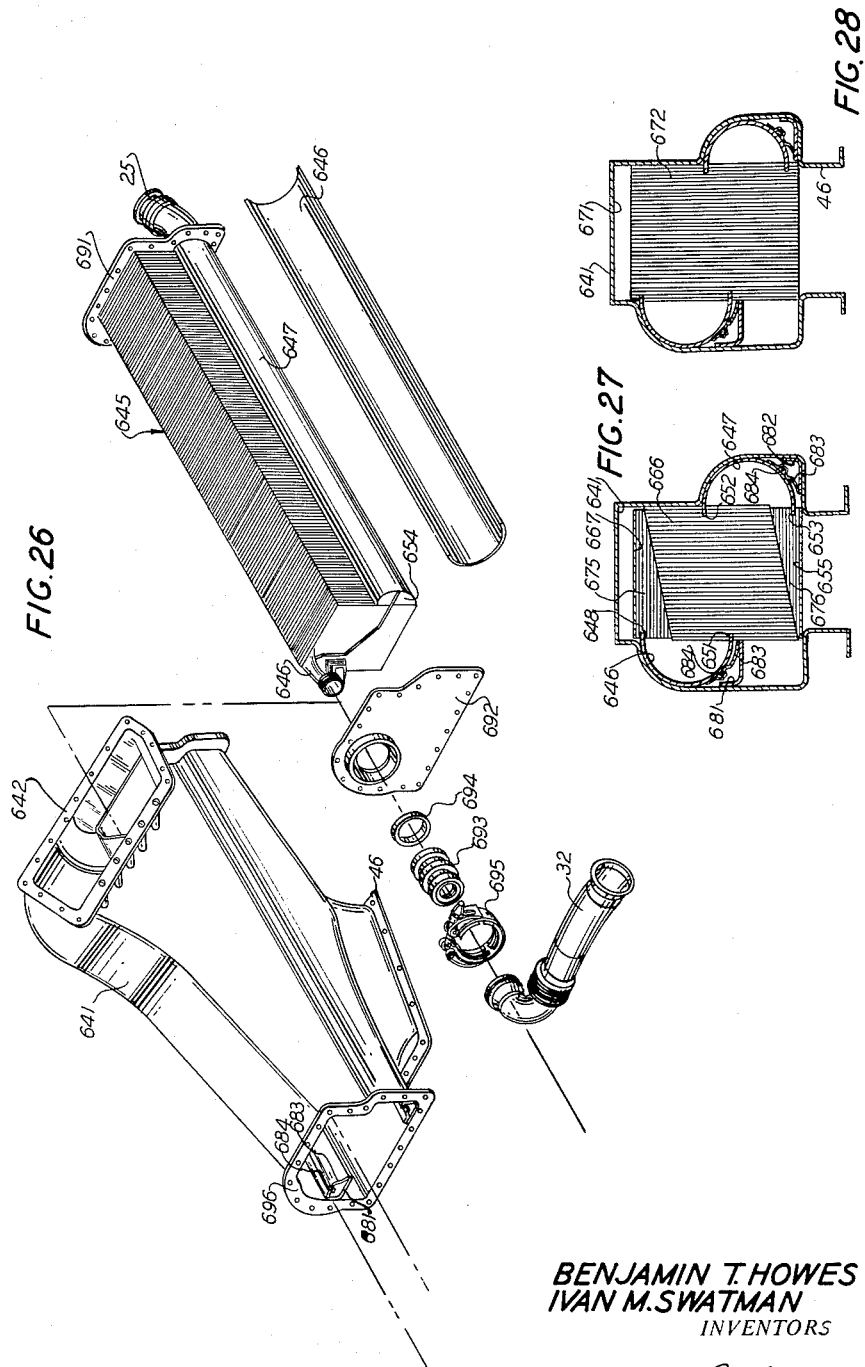

Sept. 7, 1965    B. T. HOWES ETAL    3,204,406
COOLING SYSTEM FOR A RE-EXPANSION GAS TURBINE ENGINE
Original Filed April 4, 1960    24 Sheets-Sheet 21

BENJAMIN T. HOWES
IVAN M. SWATMAN
INVENTORS

BY John R. Faulkner
Keith L. Zerschling
ATTORNEYS

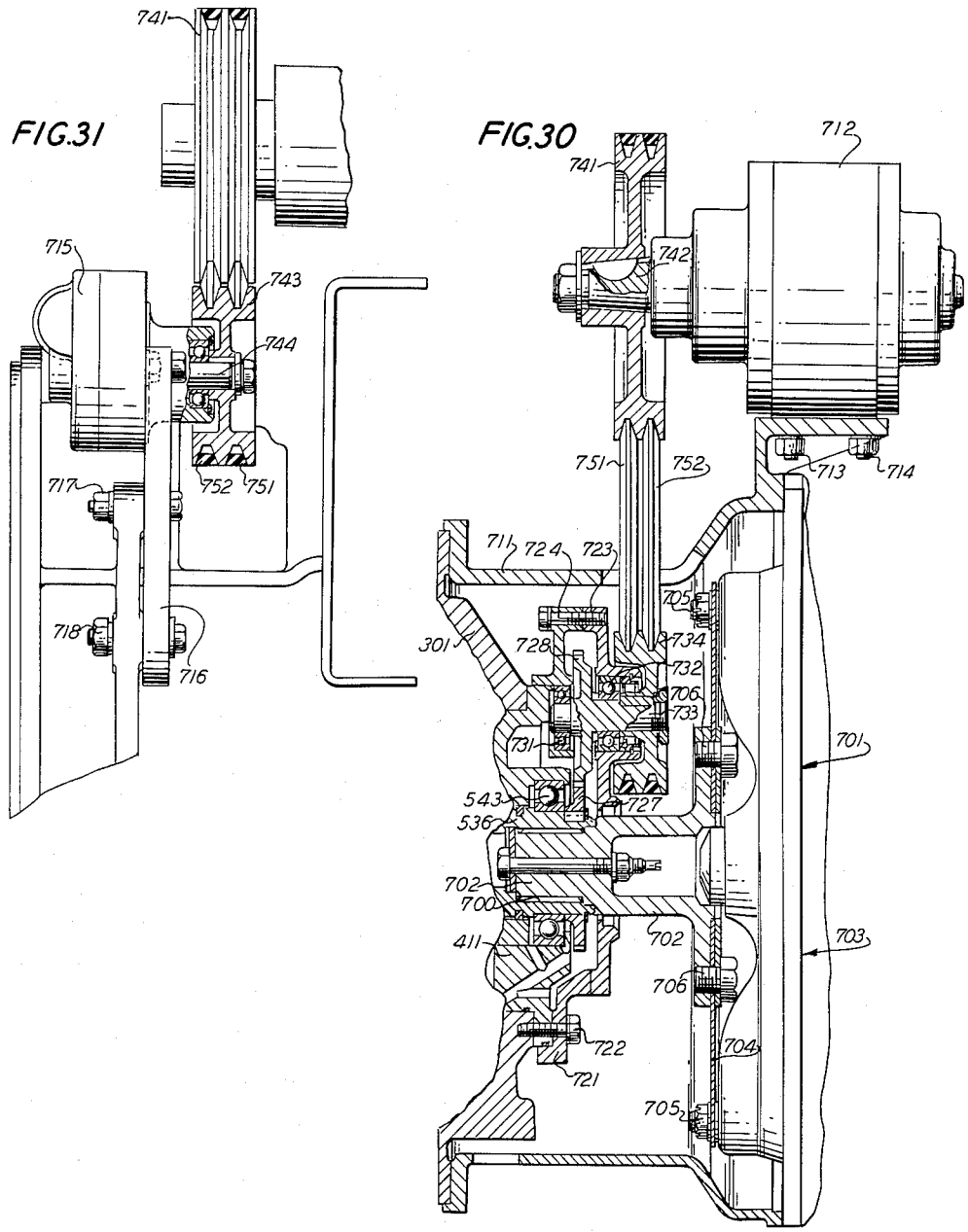

United States Patent Office 3,204,406
Patented Sept. 7, 1965

3,204,406
COOLING SYSTEM FOR A RE-EXPANSION
GAS TURBINE ENGINE
Benjamin T. Howes and Ivan M. Swatman, Birmingham, Mich., assignors to Ford Motor Company, Dearborn, Mich., a corporation of Delaware
Original application Apr. 4, 1960, Ser. No. 19,797. Divided and this application Nov. 21, 1960, Ser. No. 70,463
1 Claim. (Cl. 60—39.17)

This application is a division of our copending application Serial No. 19,797, entitled Gas Turbine Engine, filed April 4, 1960.

This invention relates to a gas turbine engine and more particularly to a compact gas turbine engine suitable for use in an automotive vehicle.

A growing trend toward increased horsepower for highway haulers, together with military requirements for air-transportable vehicles, indicates that piston engines may soon prove inadequate within the weight limitations imposed. The gas turbine engine with its inherent advantages of compact components and continuous energy release can produce much more power than a piston engine of the same size and weight. In addition, gas turbine engines have fewer moving parts than piston engines and no liquid cooling system need be employed.

In automotive use, gas turbine engines must be operated over a broad spectrum of loads and speeds. Gas turbine engines previously contemplated for automotive use, simple-cycle, low pressure gas turbine engines, while mechanically uncomplicated, have a part load fuel economy which is not competitive with gasoline or diesel engines.

The present invention provides a gas turbine engine, suitable for use in an automotive vehicle, which has good fuel economy over a broad spectrum of loads and speeds. This is accomplished by providing a high pressure engine cycle in which a two-spool gas generator supplies hot gas to an independent power turbine. More particularly, the gas ourbine engine of the present invention includes a low pressure spool having a compressor and a turbine, a high pressure spool having a compressor and a turbine, a power turbine, a primary burner and a secondary or reheat burner. Additionally, it may include intercoolers connected between the low pressure spool compressor and the high pressure spool compressor, and recuperators connected between the high pressure spool compressor and the primary burner.

As will be more fully explained subsequently, air at atmospheric conditions is taken into the engine and compressed by the low pressure spool compressor and is then fed to the high pressure spool compressor through twin intercoolers positioned on either side of the low pressure and high pressure spools. The low pressure and high pressure spools are preferably positioned parallel to each other with the high pressure spool being positioned above the low pressure spool. The intercoolers are preferably of a cross flow type and employ air at atmospheric conditions as the cooling fluid. The cooling fluid is preferably forced through the intercoolers by a fan driven from the low pressure spool. The intercoolers reduce the temperature of the air flowing from the low pressure spool compressor thereby reducing the work of the high pressure spool compressor.

The compressed air from the high pressure spool compressor is then divided into two flow paths and passes to twin recuperators, one on each side of the engine. The recuperators heat the compressed air by means of heat transfer from the engine exhaust gases before it is supplied to the primary burner thereby reducing both the quantity of fuel required to power the engine and the exhaust gas temperature. From the recuperators, the air passes through dual inlets to the primary burner where heat is added by the combustion of fuel. Hot gases from the primary burner are supplied to the high pressure spool turbine which supplies the power for driving the high pressure spool compressor.

The gases from the high pressure spool turbine are then reheated in a secondary or reheat burner before being supplied to the power turbine. The power turbine and its shaft are aligned with the low pressure spool and the low pressure spool turbine is positioned immediately after the power turbine with respect to the flow of motive fluid. The power turbine and the low pressure spool turbine are preferably positioned in contra-rotating relationship with no nozzles interposed between them. The low pressure spool turbine is connected to power the low pressure spool compressor.

The exhaust gases from the low pressure spool turbine are then led to the twin recuperators mentioned above through a diffuser which surrounds the low pressure spool. From the recuperators the gases are exhausted to the atmosphere.

The high pressure spool operates near aerodynamic design speed and design inlet temperature through most of the load range. The low pressure spool then accelerates to a speed compatible with the load requirement of the engine. The near constant speed feature of the high pressure spool is largely instrumental in producing good fuel economy over a broad spectrum of loads and speeds, and particularly provides an advantage over simple cycle, low pressure gas turbine engines, that of good part load fuel economy.

The specific power of the gas turbine engine of the present invention is considerably higher than low pressure gas turbine engines, thus for a given power requirement, the weight, size and air flow of the gas turbine engine of the present invention is significantly lower than low pressure turbine engines. This permits the design of a high horsepower gas turbine engine which will fit into the engine compartments of modern day automotive vehicles.

An important feature of the gas turbine engine of this invention is its symmetrical design. In order to avoid eccentricities during thermal expansion and contraction of the component parts of the engine, the engine has been designed to be substantially symmetrical about a vertical plane passing through the centerline of the engine. In following this concept, twin intercoolers and twin recuperators, as discussed above, have been provided. Additional features showing this symmetry of design will become more fully apparent when the description of the engine is considered in connection with the drawings.

Another important feature of the invention is the arrangement of the components of the engine into a package which will conveniently fit into the engine compartment of a modern day automotive vehicle. The width and the height of the engine developed are substantially equal while the length thereof is slightly greater than the width and height.

As previously mentioned, the high pressure spool runs at a near constant speed over most of the load range of the engine, from 70% of rated speed at idle to 100% of rated speed at full power. The high pressure spool thus provides an excellent power source for the accessories associated with the engine and the vehicle in which the engine is mounted, such as, engine oil pumps, power steering pumps and an electrical generator. The pumps and generator provided can thus be substantially smaller than those employed with conventional engines since they operate over a speed range of 70%-100% of the rated speed of the high pressure spool.

The gas turbine engine of this invention is a high pressure high temperature machine. In order to limit severe stresses in the machine due to thermal expansion and contraction, and to reduce the amount of these thermal expansions and contractions, the gas turbine engine is constructed with thin ducts which carry the high temperature gas. The ducts are separated from the main housings of the machine, by means of suitable insulating material. In addition, the ducts are mounted within the housings so that relative movement is permitted between the ducts and the housings.

The engine is also constructed in a plurality of main parts or sections which are suitably fastened together. At least one of the connections is provided with a joint in which relative movement between sections is permitted. This joint is preferably positioned between the high pressure spool housing and the ducts leading from the intercoolers to the high pressure compressor, and comprises a cylindrical joint provided with piston rings. The ducts from the intercoolers are carried by the low pressure spool housing through the low pressure spool scrolls and the intercooler housings. This joint permits relative movement between major sections of the engine while simultaneously providing a fluid tight seal between these sections. This connection assists in reducing stresses which may have a tendency to build up as a result of differential expansion and contraction when thermal conditions within the engine change.

In gas turbine engines employing high temperature gases, particular care must be taken that the turbine rotors and blades and the bearings supporting these rotors do not become overheated. In the present invention, cooling air is supplied to a bearing supporting the low pressure spool turbine and to the faces of the low pressure spool turbine and to one face of the power turbine from the air compressed by the low pressure spool compressor after it has been intercooled. This air also provides a seal about one face of the low pressure spool turbine so that the hot motive gas cannot flow into the bearing housings. The power turbine operates at a much higher pressure than the low pressure spool turbine, therefore, the cooling air supplied to cool the turbine rotor and the bearings supporting the power turbine and to prevent hot motive gases from reaching the power turbine bearings must be supplied at a higher pressure than the cooling air supplied to perform these functions with respect to the low pressure spool turbine. The air to cool the power turbine assembly and to provide a seal about the face of the turbine is taken, therefore, from a conduit joining the high pressure spool compressor with the primary burner. Since this air may be at a high temperature, a cooler may be provided to cool it prior to the time it is supplied to the power turbine assembly.

The high pressure spool turbine is preferably formed integrally with the high pressure spool compressor, and hence is cooled by the conduction of heat through the compressor structure. This combined turbine and compressor is rotatably supported by bearings engaging a single shaft which extends from the compressor, therefore, cooling air need not be supplied to these bearings since the shaft and the supporting bearings operate at a relatively cool temperature.

An integrated lubricating system for the gas turbine engine of the present invention is provided for lubricating the bearings supporting the various shafts in the engine and for lubricating the various gear sets employed. As previously mentioned, a plurality of engine oil pumps are driven by the high pressure spool at substantially a constant speed over a wide load range. It is preferred to employ three pumps, with two of these pumps being connected to collection points or sumps in the engine for delivering oil to a common collection point or sump which is connected to the third pump. The third pump delivers oil under pressure to the various bearings and gear sets that need lubrication, preferably through an oil filter and an oil cooler. An important feature of the lubrication system is the provision of strategically placed check valves which prevent the oil in the system from draining into the various collection points or sumps when the engine is at rest. Thus, all of the points of the engine which need lubrication are adequately lubricated from the moment the engine is started.

An object of the present invention is the provision of a gas turbine engine suitable for use in an automotive vehicle.

Another object of the invention is to provide a gas turbine engine, suitable for use in an automotive vehicle, having good fuel economy over a broad spectrum of loads and speeds.

A further object of the invention is the provision of a gas turbine engine having good part load fuel economy which is suitable for use in an automotive vehicle.

Another object of the invention is the provision of a gas turbine engine which has a symmetry of design with respect to its major components.

A further object of the present invention is the provision of a gas turbine engine having high specific power and hence a high horsepower to weight ratio.

Still another object of the invention is the provision of a gas turbine engine which will conveniently fit into the engine compartment of a modern day automotive vehicle.

A further object of the invention is to provide a gas turbine engine in which engine accessories are operated at substantially a constant speed.

Still another object of the invention is the provision of a gas turbine engine in which thermal expansions and contractions and the stresses produced thereby are reduced to a minimum.

A further object of the invention is the provision of a cooling system and a lubricating system for a gas turbine engine.

Another object of the invention is the provision of a gas turbine engine having means for driving necessary automotive vehicle accessories, such as, a power steering pump and an air conditioner or refrigeration system compressor.

Other objects and attendant advantages of the present invention will become more readily apparent when the specification is considered in connection with the attached drawings in which, FIG. 1 is a perspective view of the gas turbine engine of the present invention;

FIG. 4 is a front elevational view of a slightly modified form of the gas turbine engine shown in FIG. 1 with the exception of the recuperators which are not shown;

FIG. 5 shows a schematic of the thermodynamic cycle of the gas turbine engine of the present invention;

Figure 3:
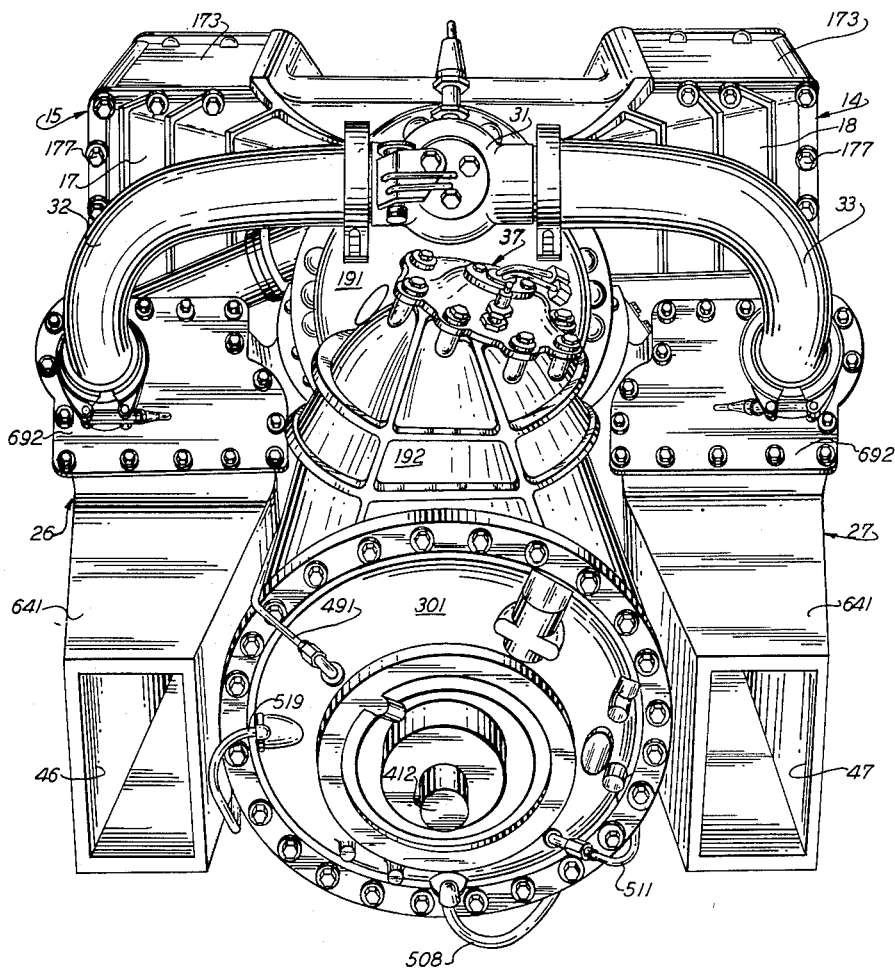
FIG. 3 is a rear perspective view of the gas turbine engine of FIG. 1 showing some of the components in more detail.
Figure 7:
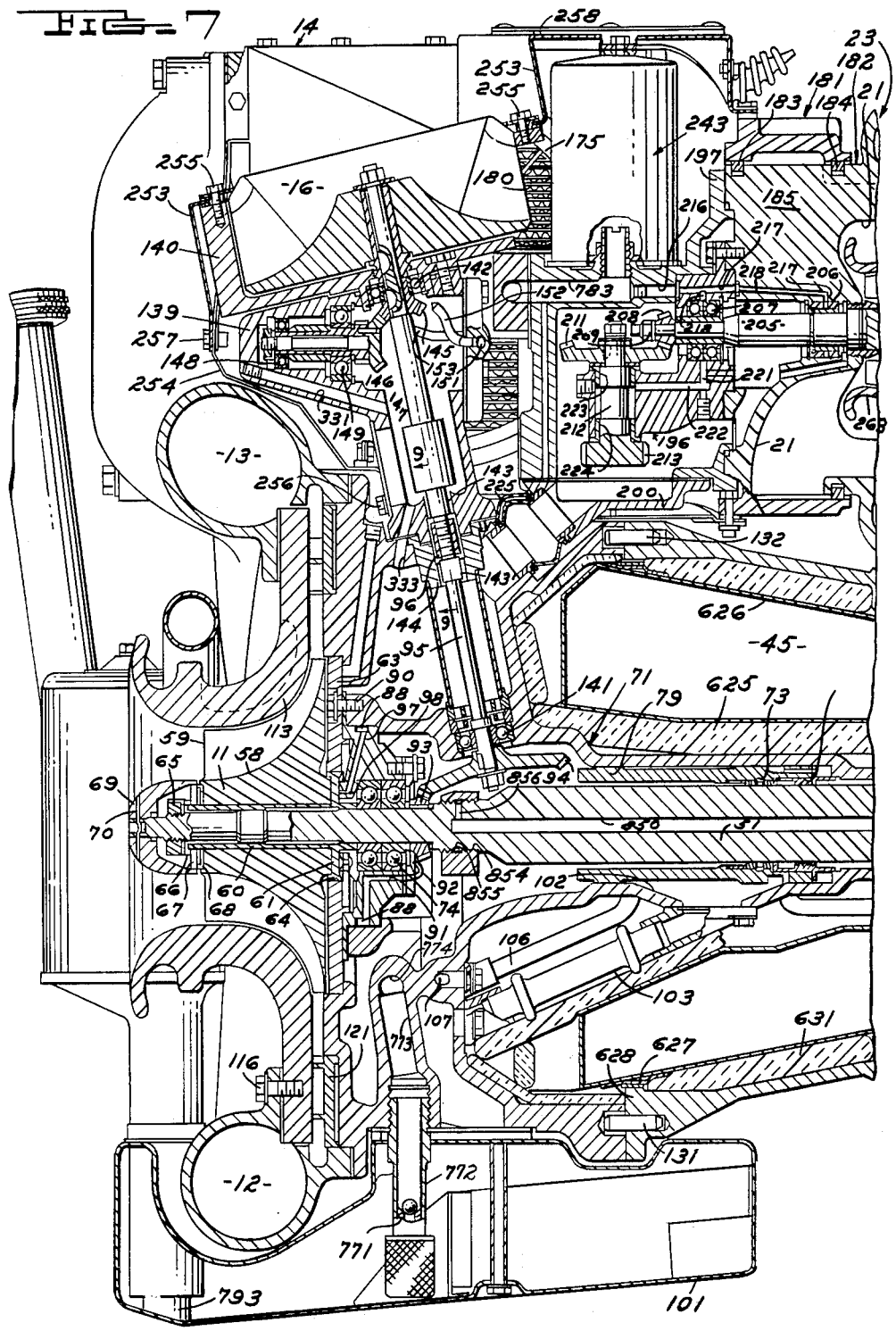
Figure 18:
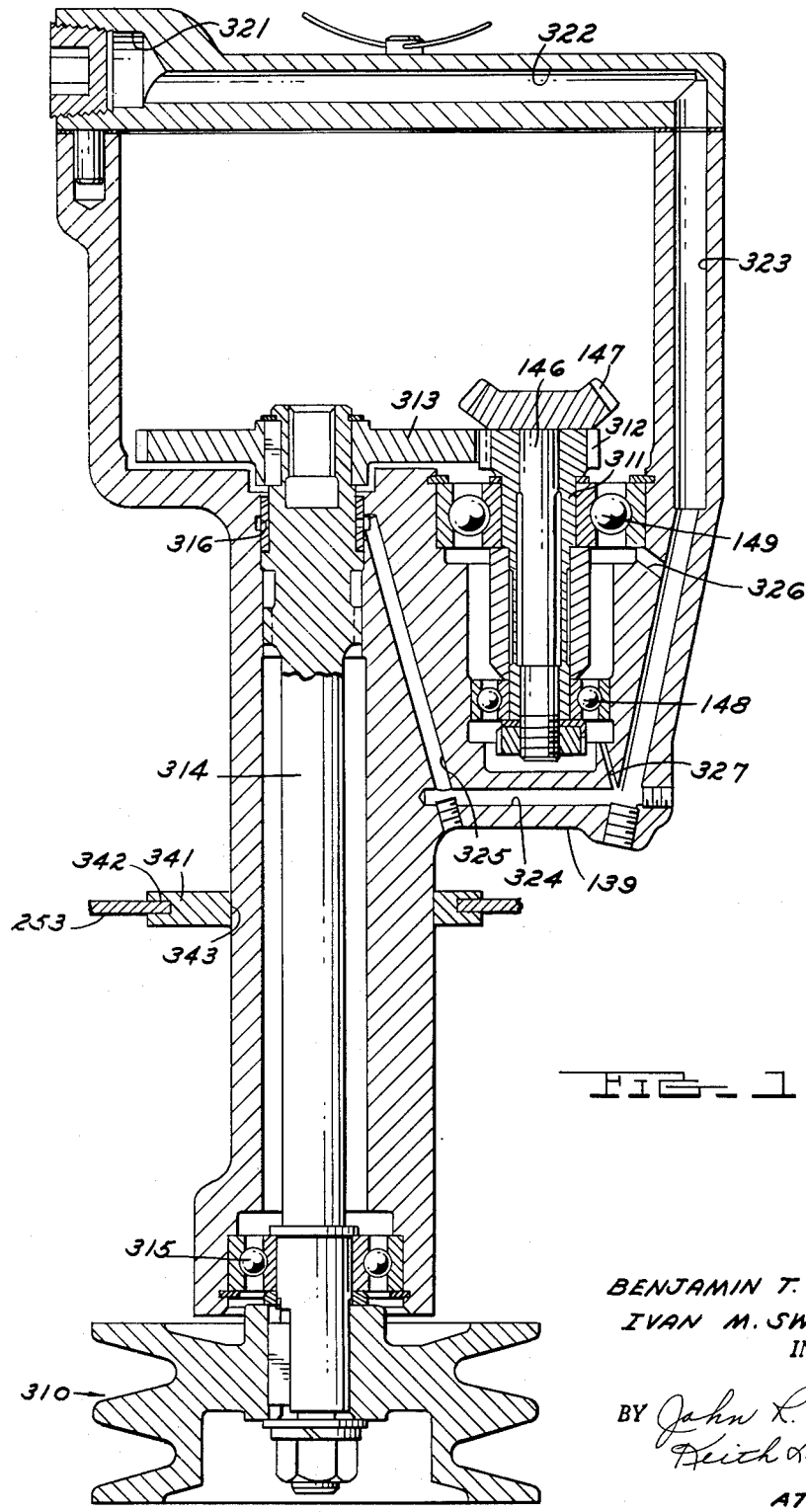
Figure 19:
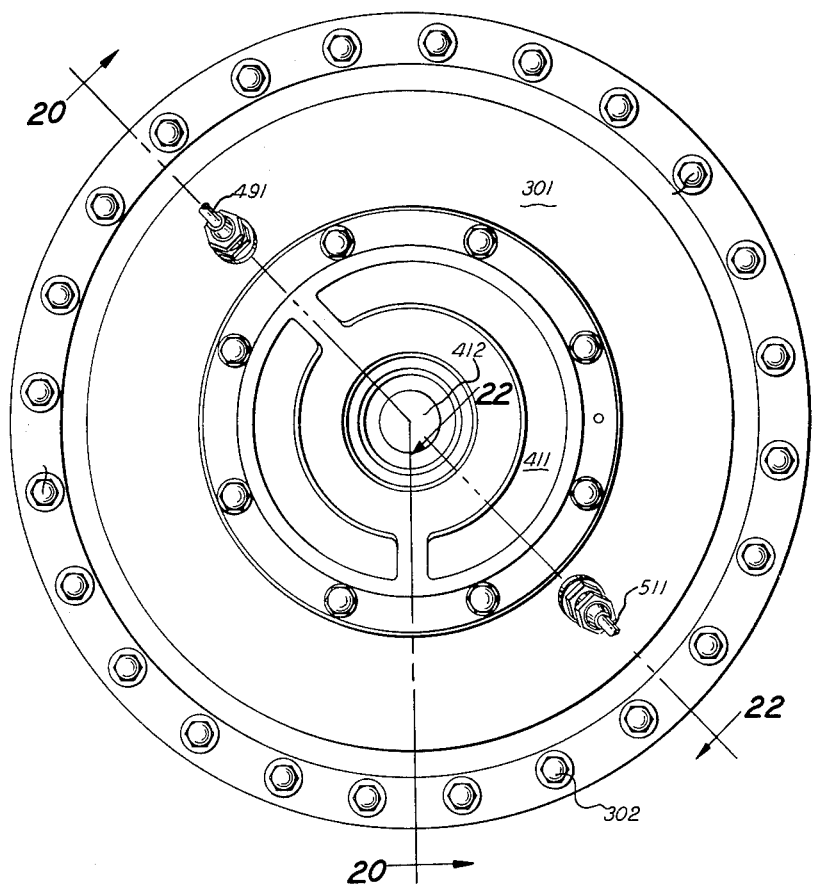
Figure 20:
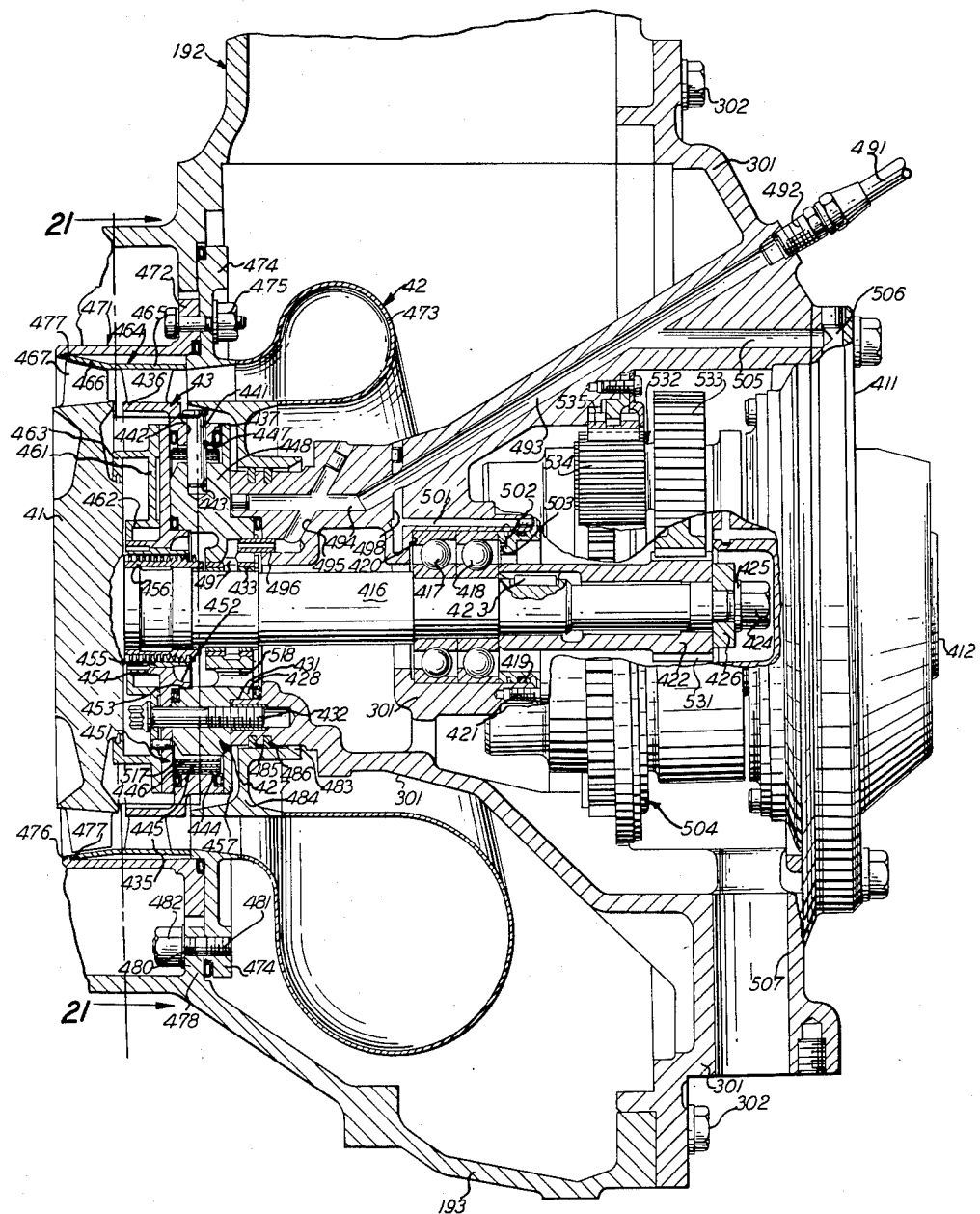
Figure 21:
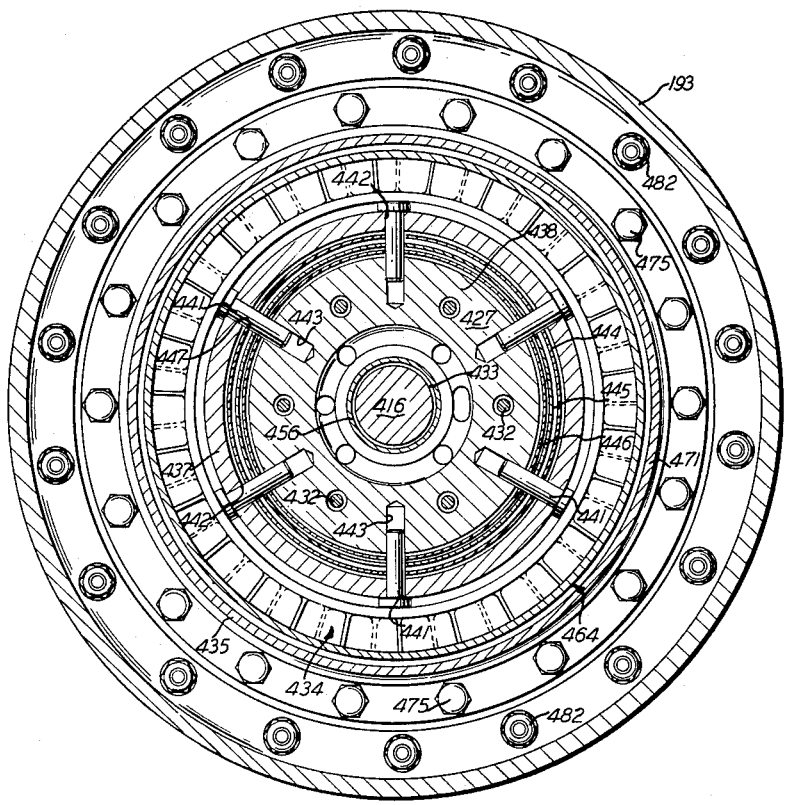
Figure 22:
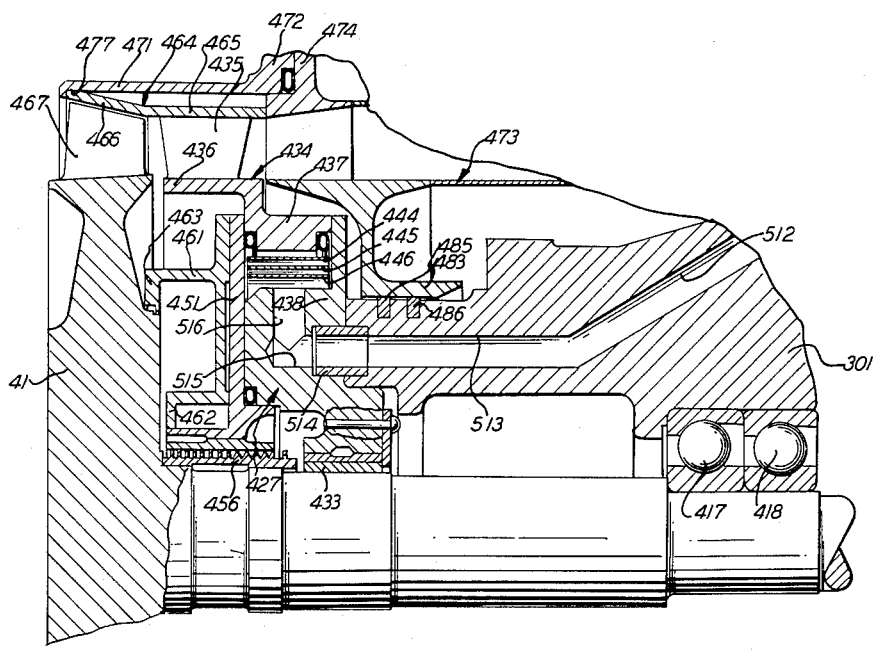
Figure 23:
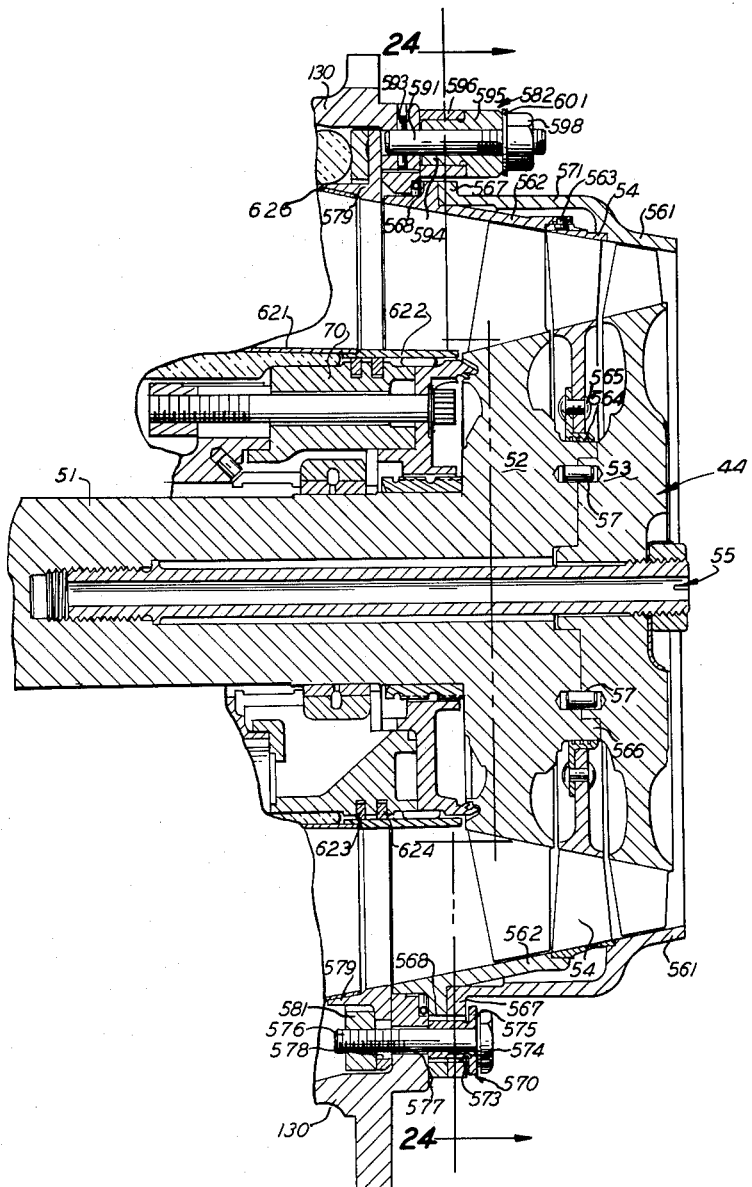
Figures 24, 25:
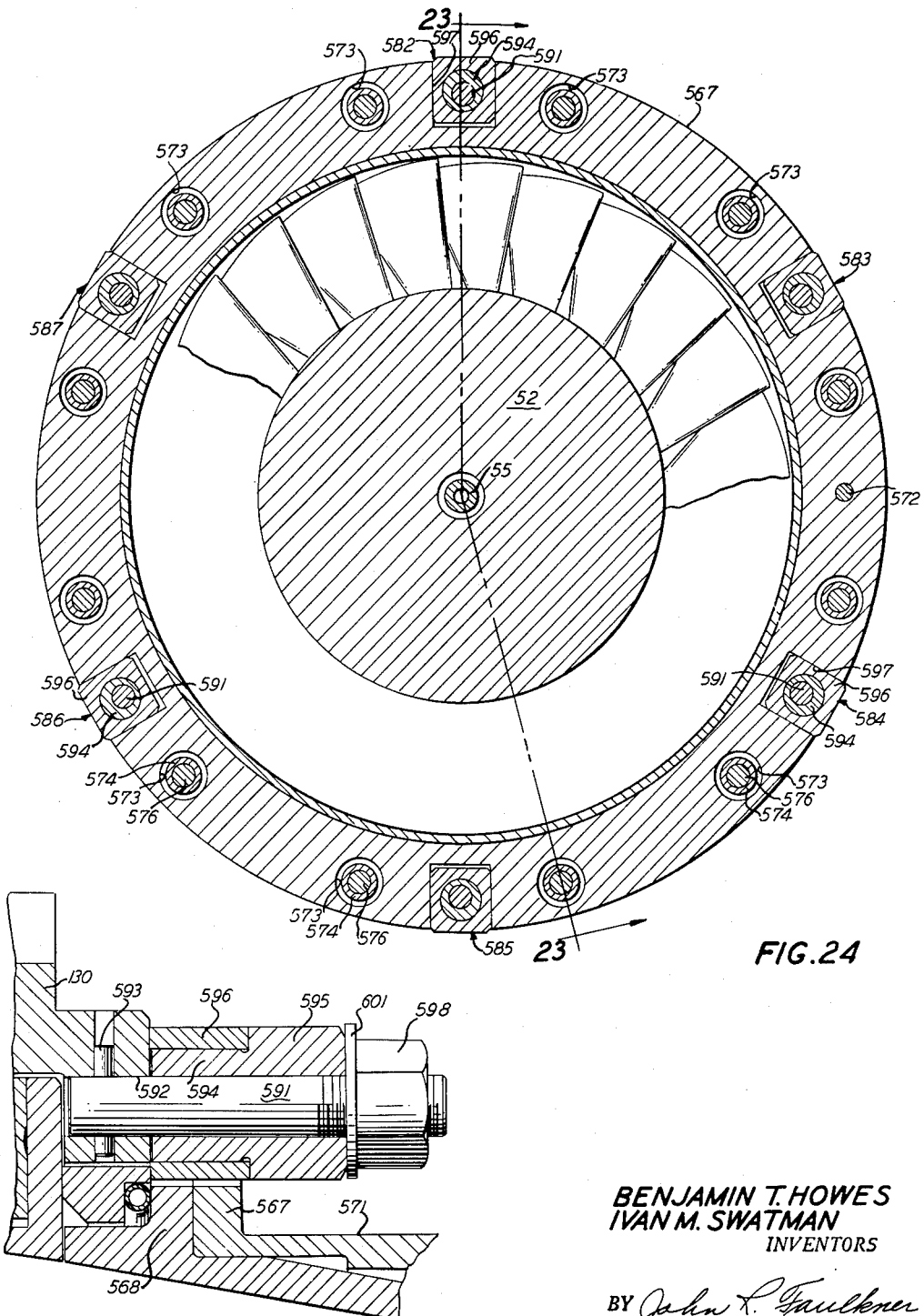
Figure 29:
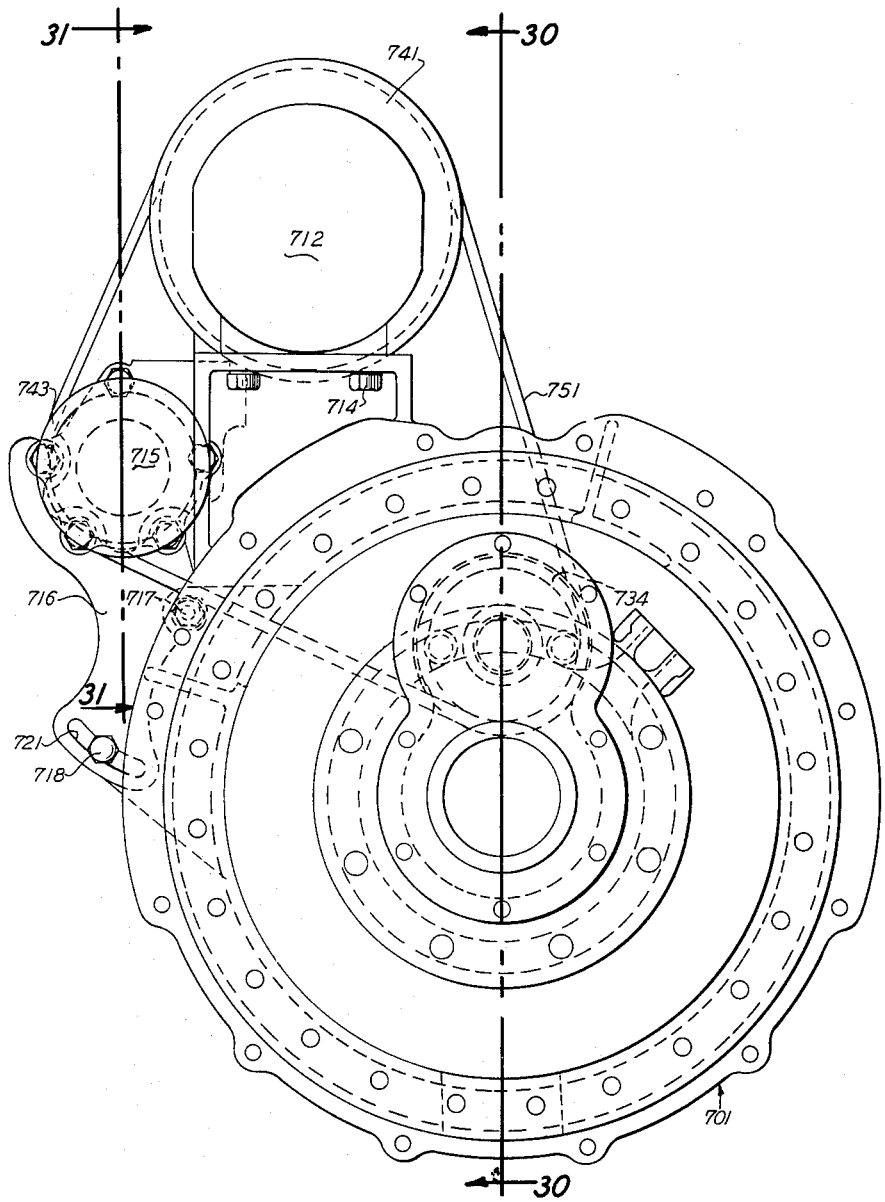
Figure 32:
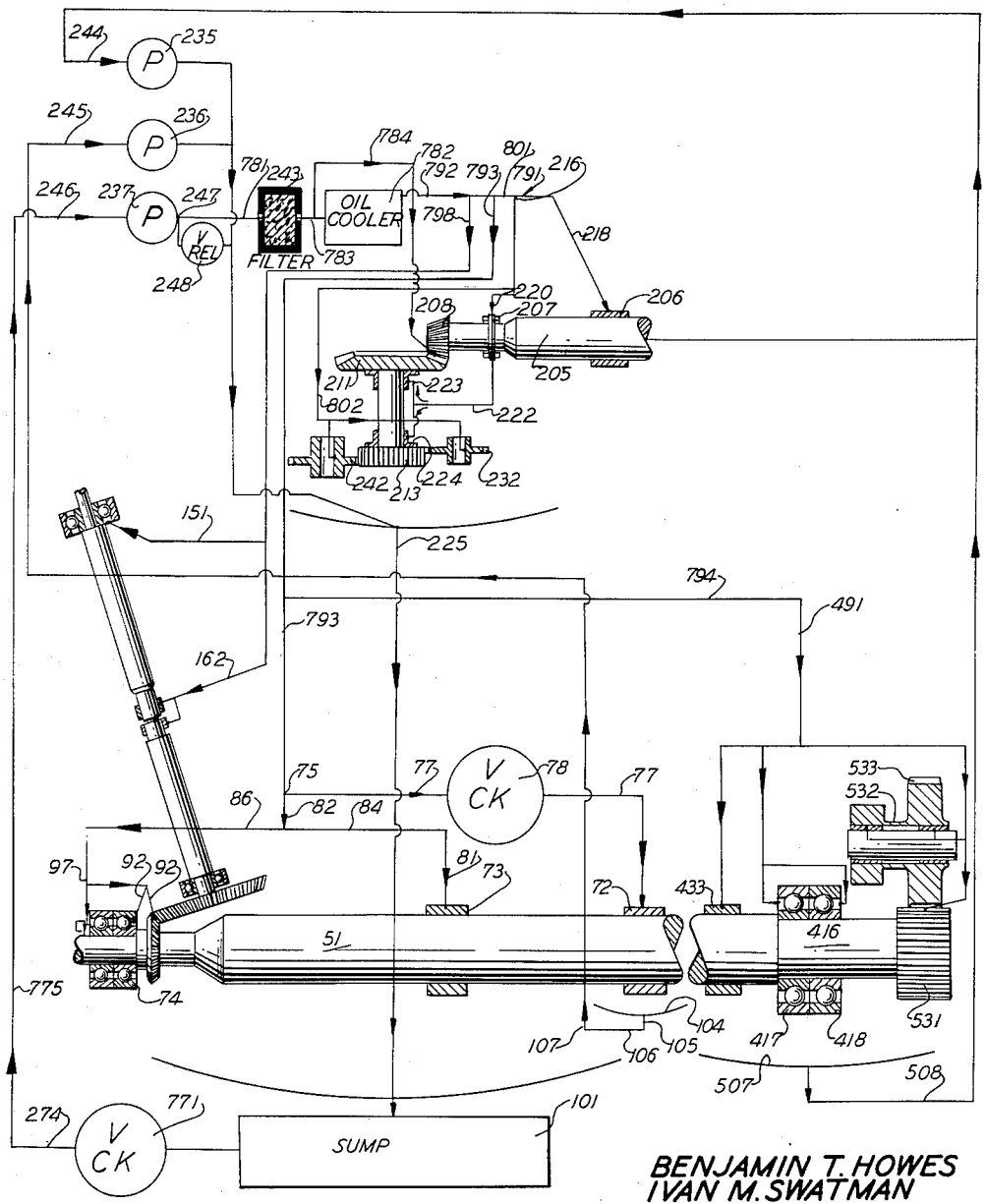
Figure 33:
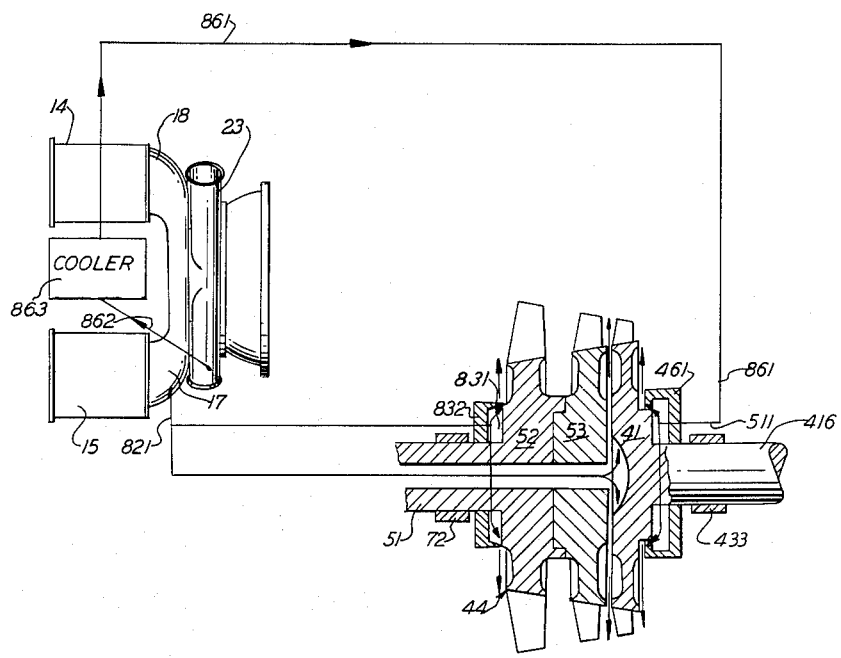

FIGS. 7 and 8, when disposed in side to side relationship, constitute a longitudinal sectional view of the gas turbine engine of the present invention taken along the lines 7—7 and 8—8 of FIG. 4;

FIG. 9 is a sectional view partially in elevation taken along the lines 9—9 of FIG. 7 with the shaft omitted;

FIG. 10 is a partial longitudinal sectional view taken along the lines 10—10 of FIG. 4;

FIG. 11 is a rear elevational view partially in section of the low pressure spool housing and casing with other portions of the engine being shown in elevation;

FIG. 12 is a rear elevational view partially in section of the rear housing of the gas turbine engine;

FIG. 13 is a top plan view of the accessory gear box of the present invention;

FIG. 14 is a sectional view taken along the lines 14—14 of FIG. 13;

FIG. 15 is a sectional view taken along the lines 15—15 of FIG. 13;

FIG. 16 is an end view of the primary burner of the present invention which is shown in section in FIG. 8;

FIG. 17 is an end view of the reheat or secondary burner of the present invention which is shown in section in FIG. 12;

FIG. 18 is a sectional view taken along the lines 18—18 of FIG. 11 and showing one means for driving external power accessories, such as, a power steering pump and an air or refrigerator compressor;

FIG. 19 is a rear elevational view of the reduction gear box housing with certain conduits eliminated, which is also shown in perspective in FIG. 3;

FIG. 20 is a sectional view taken along the lines 20—20 of FIG. 19;

FIG. 21 is a sectional view taken along the lines 21—21 of FIG. 20;

FIG. 22 is a partial sectional view taken along the lines 22—22 of FIG. 19;

FIG. 23 is an enlarged sectional view of the low pressure spool turbine showing the turbine wheels, shrouds and an adjusting mechanism for the shrouds, taken along the lines 23—23 of FIG. 24;

FIG. 24 is a cross sectional view taken along the lines 24—24 of FIG. 23;

FIG. 25 is an enlarged cross sectional view of one of the eccentric adjusting mechanisms shown in FIGS. 23 and 24;

FIG. 26 is an exploded view of the recuperator structure of the present invention;

FIG. 27 is a cross sectional view of the assembled recuperator structure;

FIG. 28 is another cross sectional view of the assembled recuperator structure;

FIG. 29 is a rear elevational view of a modified form of the invention showing a transmission and engine accessories, including a power steering pump and an air or refrigerant compressor;

FIG. 30 is a sectional view partially in elevation along the lines 30—30 of FIG. 29;

FIG. 31 is a sectional view partially in elevation along the lines 31—31 in FIG. 29;

FIG. 32 is a diagrammatic illustration of the lubrication system of the gas turbine engine of the present invention and, FIG. 33 is a diagrammatic illustration of the cooling air system of the gas turbine engine of the present invention.

Referring now to the drawings in which like reference numerals designate like parts throughout the several views thereof, there is shown in 1 through 4 and 6 through 8 the overall arrangement of the major components of the gas turbine engine of the present invention. FIG. 5 shows these components and the cycle of the engine in schematic form.

Air is taken into the gas turbine engine of the present invention by means of a low pressure compressor, preferably a centrifugal compressor 11, where it is compressed prior to delivery to a pair of twin scrolls 12 and 13. The twin scrolls divide the air flow from the low pressure compressor for delivery to a pair of intercoolers 14 and 15. These intercoolers are of the cross-flow air to air type, and are supplied cooling air by a fan 16 which delivers cooling air outwardly from the center of the power plant through the intercooler structures. From the intercoolers, the cooled air is recombined by means of a pair of ducts 17 and 18 and is then fed into the inlet chamber 21 (see FIGS. 6 and 7) of high pressure spool compressor 22 which is preferably of the centrifugal type. The high pressure spool compressor further compresses the air and delivers it into scroll 23.

Figure 1:
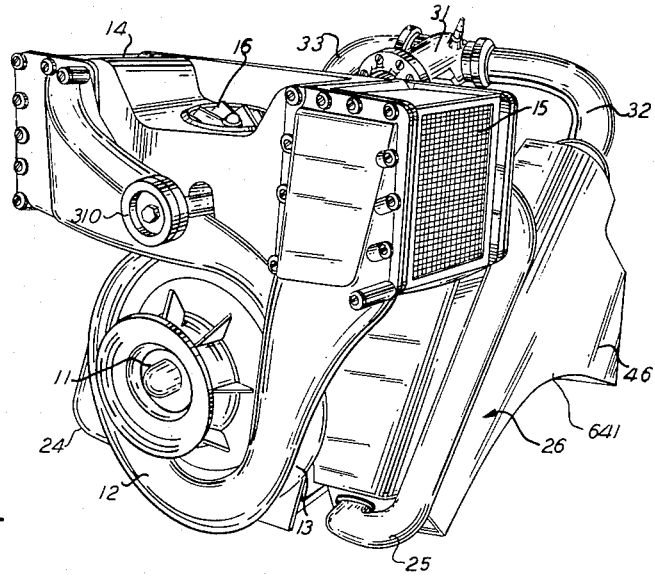

The air from the high pressure spool compressor is then divided into two flow paths by means of conduits 24 and 25 for delivery to a pair of recuperators 26 and 27 which are located on either side of the engine. As will be explained in more detail in the following description, these recuperators are of the cross-counter flow type and provide a means for heating the air from the high pressure compressor prior to the time it is delivered to a primary burner 31. As can readily be appreciated by an inspection of FIGS. 1 and 3, the heated air from the recuperators 26 and 27 is recombined in the primary burner 31 by means of conduits 32 and 33 which extend from the recuperators into either side of the burner 31.

The compressed air is then heated in the primary burner by the addition of fuel through the nozzle 34 (see FIG. 8) which may be of the recirculating type. The effluent from the primary burner is then delivered to a high pressure turbine 35, which is preferably of the radial inflow type, through a scroll 36. The high pressure turbine furnishes the power for driving the high pressure compressor, and these two devices together with the shaft for supporting them is known as the high pressure spool. The gases from the high pressure turbine are then delivered to a secondary or reheat burner 37 by means of a central conduit 38. The gases are then reheated to a high temperature in the reheat burner before being fed to a power turbine 41 through a scroll assembly 42 and a nozzle assembly 43.

From the power turbine 41 the hot gases expand through a two-stage low pressure turbine, generally designated by the numeral 44, into a diffuser 45. The exhaust gases are then split and led into recuperators 26 and 27 as can best be seen by reference to FIG. 6 which clearly shows the connection between the diffuser 45 and the recuperator 26. Ahe the exhaust gases flow through the recuperators heat transfer takes place between these exhaust gases, and the compressed air from the high pressure compressor 22. The cooled exhaust gases are then expelled to the atmosphere through exhaust conduits 46 and 47 which are formed integrally with the recuperator casings of recuperators 26 and 27. The low pressure compressor 11 and the low pressure turbine 44 together with their interconnecting shaft form the low pressure spool. As can be readily appreciated by an inspection of FIGS. 6, 7 and 8, the low pressure spool and the high pressure spool are disposed in parallel relationship with the high pressure spool being positioned above the low pressure spool.

Referring now to FIG. 5 which discloses the components and the cycle of the gas turbine engine of the present invention in schematic form, the temperatures and pressures at various points in the cycle will be given by way of example. It is to be understood in referring to FIG. 5 that the intercoolers represented by the symbol are actually the twin intercoolers 14 and 15, and that the recuperators shown in schematic form are actually the twin recuperators 26 and 27 discussed above. At rated power for a 300 horsepower machine at 100° F. ambient temperature, 2.71 lbs. of air per second enters the low pressure spool compressor 11 which rotates at 46,500 r.p.m. A silencer may be provided to aid in eliminating the high pitch noise created by the compressor. The air is raised to a pressure of 58 p.s.i.a. and a temperature of 430° F. by this compressor and is then fed to the twin intercoolers 14 and 15 through twin scrolls 12 and 13. The intercoolers lower the temperature to 220° F. before it enters the high pressure compressor 22 where the pressure is raised to 224 p.s.i.a. and the temperature is raised to 625° F. The high pressure spool rotates at a speed of 91,500 r.p.m.

The compressed air is then fed to the twin recuperators 26 and 27 where the temperature of the air is raised to 960° F. at substantially constant pressure by heat transfer from the exhaust gases thereby reducing the quantity of fuel required and the temperature of the exhaust gases.

From the recuperators, the air passes through the dual conduits 32 and 33 to the primary burner 31 where the temperature is raised to 1700° F. by the continuous burning of fuel at substantially constant pressure. After the gases from the primary burner pass through the high pressure turbine where the temperature is reduced to 1300° F. and the pressure is reduced to 85 p.s.i.a., they are reheated in the reheat or secondary burner 37 to a temperature of 1700° F. at substantially constant pressure. The heated gas is then supplied to the power turbine 41 where the temperature is reduced to 1400° F. and the pressure is reduced to 40 p.s.i.a. In the low pressure turbine 44 and the diffuser 45 the gases expand to a pressure slightly above atmospheric at a temperature of 1070° F. The gases are then exhausted to the atmosphere through the twin recuperators 26 and 27 where the temperature is reduced to approximately 750° F.

The foregoing description described the gas turbine engine of the present invention in terms of its general components in order that the more detailed description which is to follow may be more easily comprehended and so that the relationship of the various elements and components may be more easily understood.

Referring now to FIGS. 6 through 8 and 10, the low pressure spool, the low pressure spool housing and associated elements will be explained in greater detail. The low pressure spool comprises the low pressure compressor 11, the two-stage low pressure turbine 44 and the interconnecting shaft which is designated by the numeral 51. The two-stage low pressure turbine 44 includes a first rotor 52 and a second rotor 53 with an interstage nozzle 54 interposed between them. The first rotor 52 may be formed integrally with the shaft 51 while the second rotor 53 is affixed to the shaft by means of a hollow bolt 55 and a nut 56. A plurality of pins, one of which is shown at 57, prevent relative rotation between the two turbine rotors.

The low pressure spool compressor 11 includes a hub 58 and blades 59, with the hub having a longitudinal bore for receiving a sleeve 60 which is press fitted into the bore. The sleeve 60 includes a radially extending flange 61 which together with a plate 63 affixed to the low pressure spool housing forms a labyrinth seal 64. The sleeve 60 is keyed to the low pressure spool shaft 51 and the hub is secured to the shaft by a nut 65 acting through a sleeve 66 and a pair of washers 67 and 68. The washer 67 may be a Bellville washer so that the load is applied to the hub 58 by the nut 65 is equal at all points around the face of the hub. The Bellville washer also compensates in axial tension on the bolt for variations in thermal growth of the compressor 11. A covering hub or spinner 69 is also threaded onto shaft 51 and is held in place by a pin 70. This hub or spinner provides a smooth flow path for the air entering compressor 11.

The low pressure spool is rotatably mounted in a low pressure spool housing 71 by means of sleeve bearings 72 and 73 and a double ball bearing 74. These bearings are suitably lubricated by means of a lubrication system which will be expalned more in detail at a later point in the specification. Oil under pressure is supplied from this system to conduit 75 drilled in the low pressure spool housing 71 (see FIG. 10). From this conduit the oil under pressure is supplied to the bearing 72, which is carried by bearing carrier 70, through conduit 76 drilled in the housing 71 and a pipe 77 which includes check valve 78. The sleeve bearing 73 is supported in a cylindrical sleeve 79 which is in turn supported by the low pressure spool housing. This sleeve has a longitudinal conduit 81 positioned therein which connects the sleeve bearing 73 to the oil under pressure in conduit 75 through conduit 82 drilled in the low pressure spool housing, transfer piece 83 and conduit 84 drilled in the sleeve.

Lubricating oil under pressure is also supplied to the double ball bearing 74 from the conduit 75 by means of conduits 86 and 87 in the low pressure spool housing 71, an annular passageway 88 in bearing carrier 89, passageway 91 in the bearing carrier and a transfer piece 92 connected to the passageway 91. The bearing carrier 89 is positioned within the low pressure spool housing 71 and is affixed thereto, along with plate 63, by means of a plurality of bolts, one of which is shown at 90 (see FIG. 7). The transfer piece 92 directs oil upon the double ball bearing 74 and upon the mesh between bevel gear 93 affixed to the low pressure spool shaft 51 and the bevel gear 94 affixed to shaft 95, which interconnects the bevel gear 94 and the fan 16. The shaft 95 is formed from two pieces which are interconnected by a splined sleeve 96. Oil is also directed against the flange 61 of sleeve 60 via passageways 97 and 98 in the bearing carrier 89 to provide an anti-thrust bearing for the low pressure spool.

The gas turbine engine of this invention is provided with an oil sump 101 suitably affixed to the bottom portion of the low pressure spool housing 71. Scavenge oil from the double ball bearing 74 falls downwardly through the cored portion of the housing 71 into this sump. Similarly, scavenge oil from the sleeve bearing 73 is directed into the sump 101 from chamber or auxiliary sump 102 and pipe 103 which connects the chamber 102 to an open space in the housing 71. A labyrinth seal is positioned adjacent the bearing 73 to prevent any oil from going down the shaft in the direction of the sleeve bearing 72. This labyrinth seal assures that the scavenge oil from the sleeve bearing 73 will find its way into the chamber 102. Scavenge oil from the sleeve bearing 72 falls into a chamber or auxiliary sump 104 positioned in the bearing carrier 70, and is then directed to a scavenge pump, which will be described at a later point in the specification, by means of pipes 105, 106 and a conduit 107, which is formed by drilling of the low pressure spool housing 71. The sump 101 may be filled with oil by means of a fill pipe 108 shown in FIG. 4.

The scrolls 12 and 13 for the low pressure compressor 11 are bolted to the low pressure spool housing 71 by a plurality of bolts, two of which are shown at 111 and 112 (see FIG. 10). A shroud 113 for the low pressure compressor 11 is piloted from the low pressure spool housing 71 by a plurality of shoulder bolts, one of which is shown at 114. Each of these bolts has a portion of reduced diameter 115 which extends across the flow path of the compressed air as it flows from the compressor into the scrolls 12 and 13. The shroud 113 is affixed to the scrolls 12 and 13 by a plurality of bolts denoted by the numeral 116. The diffuser 121 for the low pressure compressor 11 is positioned between the low pressure spool housing 71 and the shroud 113, and in addition, engages, at its outer diameter, a shoulder on the scrolls 12 and 13. The diffuser has a plurality of diffuser blades, some of which are shown in cross section at 122, 123 and 124.

The low pressure spool has an outer casing 130 positioned about the low pressure spool shaft 51 and that portion of the low pressure spool housing 71 which supports the shaft (see FIG. 7). This casing is affixed to the low pressure spool housing 71 by means of a plurality of dowel pins, two of which are shown at 131 and 132, and by a plurality of bolts 133 which are shown in FIG. 11.

As previously mentioned, the fan 16 is driven from the low pressure spool shaft 51 by means of the bevel gears 93, 94, and the shaft 95. The shaft 95 is supported in the low pressure spool housing by a ball bearing 141 positioned adjacent the bevel gear 94. The shaft 95 is also supported in a fan housing composed of two pieces, designated by the numerals 139 and 140, by a ball bearing 142 positioned adjacent the fan 16 and by means of sleeve bearings 143 and 143'. The sleeve bearings are positioned in the fan housing member 139 and a support structure 144 positioned between the low pressure spool housing and the fan support member 139. The fan shaft 95 may have a beveled gear 145 affixed thereto adjacent the bearing 142 for driving a stub shaft 146 by means of an intermeshing bevel gear 147. This stub shaft is supported in the fan housing member 139 by means of a pair of ball bearings 148 and 149. The stub shaft 146 is employed to drive a shaft which may be used to drive external engine accessories, such as, a power steering pump and a refrigerant compressor. This structure will be explained more in detail in connection with FIG. 18.

Lubricating oil for the ball bearing 142 and for the intermeshing bevel gears 145 and 147 is supplied from conduit 151 in a plate affixed to the fan housing. This conduit has a pair of oil pipes 152 and 153 affixed thereto which force oil directly onto the bearing 142 and the intermeshing gears 145 and 147. The source of the oil under pressure supplied to the conduit 153 will be explained more in detail when the lubricating system for the engine is described.

FIG. 9 discloses the structural supporting members for the sleeve bearings 143 and 143'. As shown here, the member 139 of the fan housing is secured to the low pressure spool housing 71 by a plurality of bolts, one of which is shown at 161. As can be seen by reference to this figure, the bearing support member 144 is positioned between the member 139 and the low pressure spool housing 71. Oil under pressure is supplied to the bearings 143 and 143' from a conduit 162 positioned in the fan housing member 139. The conduit 162 receives oil under pressure from the lubricating system of the engine as will be explained in detail at a later point in the specification. The oil from the conduit 162 is supplied to the bearing 143 by means of a conduit 163 positioned in the fan housing member 139 and to the bearing 143' by means of a conduit 164 positioned in the member 139, a transfer piece 165 and conduits 166 and 167 positioned in bearing support member 144. The lubricating oil for the bearing 141 is supplied by oil from the bearings 143 and 143' which drops downwardly from the bearings 143 and 143' onto the bearing 141.

As previously mentioned, the intercoolers 14 and 15 are of the cross flow air to air type. These intercoolers have a top sheet metal member and a bottom sheet metal member which close the top and the bottom of each of the intercoolers. The intercoolers fit into intercooler housings, one of which is partially shown in FIG. 4, and denoted by the numeral 171. These intercooler housings have a bottom plate, designated by the numeral 172, a top plate 173, a pair of side posts, one of which is shown at 174, and an inner plate with a circular opening, as shown in FIG. 7, at 175. The intercooling housings are bolted to the scrolls 14 and 15 by a plurality of bolts as shown at 176, and to the ducts 17 and 18 which connect the intercoolers to the high pressure compressor by a plurality of bolts as shown at 177 (FIG. 3). The intercooler elements may be inserted into the housings from the outside of the engine, and they include inner circular openings which fit into the circular plates 175 of the housings 171. They may be secured in place by a plurality of bolts which engage an outer sheet metal member of the intercooler and the housing. One of these bolts is shown at 178 in FIG. 4. The intercooler elements per se, as shown by reference to FIGS. 4 and 7, include alternately positioned flow conduits which are directed perpendicularly with respect to each other. Alternate conduits designated by the numeral 179 conduct the air from the scrolls 12 and 13 to the ducts 17 and 18. The other conduits, directed perpendicularly to the conduits which conduct the air from the scrolls to the ducts previously mentioned, designated by the numeral 180 (see FIG. 7), direct air from the fan 16 outwardly from the center of the engine through the intercoolers.

Figure 6:
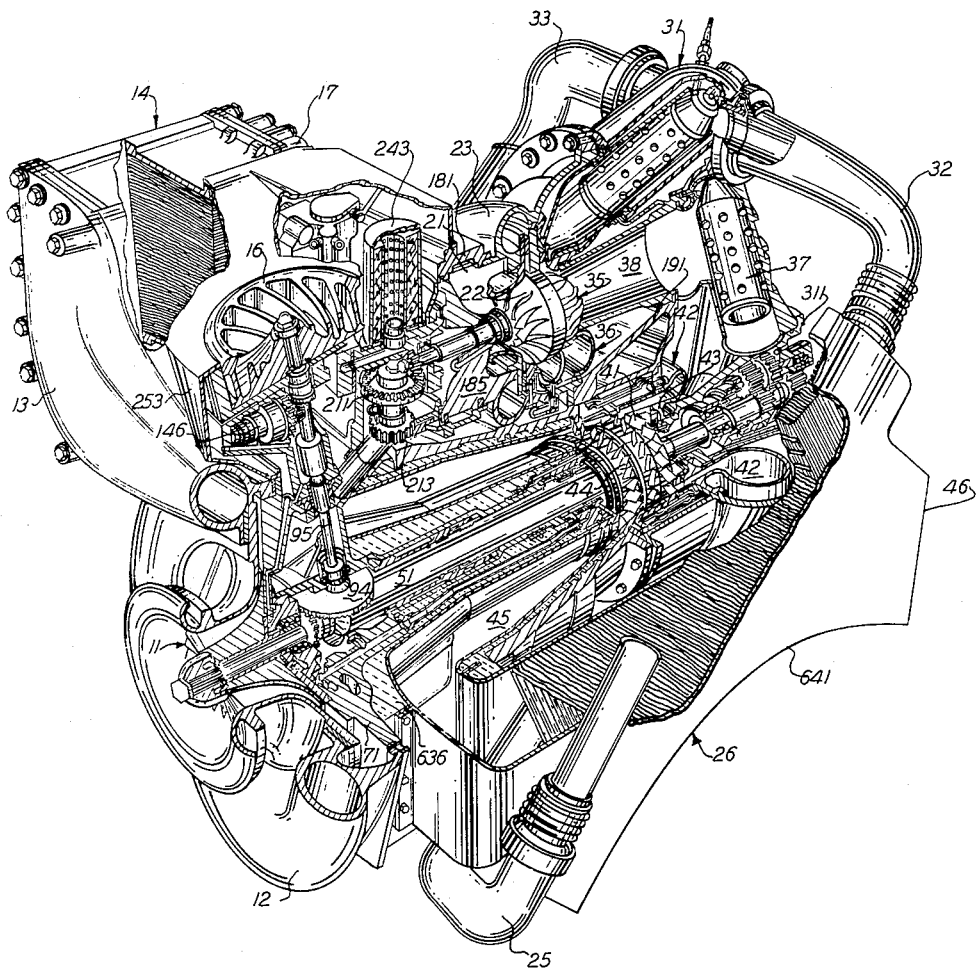
FIG. 6 is a perspective view of the gas turbine engine of the present invention with portions cut away.

The ducts 17 and 18 from the intercoolers 14 and 15 terminate at the center of the engine in a cylindrical structure denoted by the numeral 181 (see FIGS. 6 and 7). A high pressure spool housing, generally designated by the numeral 182, includes a cylindrical portion which fits within the cylindrical structure 181. Two pistons rings, designated by the numerals 183 and 184, provide a fluid tight connection between these two structures while simultaneously permitting relative movement therebetween.

The high pressure spool housing includes the inlet 21 to the high pressure compressor 22. This inlet structure includes a plurality of struts, one of which is shown at 185, to give the inlet member structural rigidity. The high pressure spool housing also includes the high pressure compressor scroll structure 23, and a flange 186 for attaching the high pressure spool housing to the rear housing of the gas turbine engine, which is generally designated by the numeral 191.

This rear housing can best be seen by reference to FIG. 12, and includes a portion 192 for supporting the secondary or reheat burner 37 and a portion 193 for enclosing the power turbine 41, the low pressure spool turbine 44 and a reduction gear box. The high pressure spool housing and the rear housing are fastened together by a plurality of bolts, one of which is shown at 194 (FIG. 8). The rear housing has a plurality of protuberances 195 (FIG. 12) for receiving the bolts 194.

The high pressure spool housing 182 has affixed thereto an accessory gear box housing, generally designated by the numeral 196. The accessory gear box is shown in FIGS. 13 and 14, and as shown in FIG. 14, has a plate 197 with a plurality of apertures 198 for receiving the bolts (not shown), to affix the accessory gear box housing to the high pressure spool housing. The accessory gear box also includes a bottom pan 200 affixed to the housing 196 by a plurality of bolts 201 (FIG. 14).

As previously mentioned, the high pressure compressor 22 and the high pressure turbine 35 are combined in a back-to-back relationship, and are preferably one structural member. A shaft 205 extends from the compressor side of the combined compressor-turbine member, and is supported in the high pressure spool housing by means of a sleeve bearing, designated by the numeral 206. The shaft 205 is also supported in the accessory gear box housing by means of a double ball bearing 207. A gear 208 is affixed to the end of the shaft 205 by a nut 209, and this bevel gear meshes with another bevel gear 211 affixed to a shaft 212. A spur gear 213 affixed to the shaft 212 serves to drive a combined started-generator for the engine, as well as a plurality of engine oil pumps which will be explained in detail at a later point in the specification.

Oil under pressure for lubricating the sleeve bearing 206 and the double ball bearing 207 is supplied from a conduit 216. From the conduit 216 oil flows into conduit 217 and to the sleeve bearing 206 through conduits 218 and 219. Oil for lubricating the bearing 207 flows into an annular channel 220, and a portion of this oil from the annular channel also flows through conduits 221 and 222 to lubricate the sleeve bearings 223 and 224 which support the shaft 212. Oil from the bearings 206 207, 223 and 224 flows into the bottom of the accessory gear box housing and from there into the cored openings in the low pressure spool housing 71 by means of a conduit 225 which connects the accessory gear box housing with the low pressure spool housing. From the cored openings in the low pressure spool housing the oil then finds its way into the sump 101.

Referring now to FIGS. 13 through 15, there is shown the accessory gear box including the housing 196. As previously discussed, the accessory gear box housing supports a bevel gear 211 driven by the bevel gear 208 affixed to the shaft 205 of the high pressure spool. The bevel gear 211 drives a spur gear 213 through the shaft 212. The spur gear 213 drives a combination starter-generator 231 through an idler gear 232 and a spur gear 233 affixed to a shaft 234 of the combination starter-generator. The spur gear 213 also drives three oil pumps, preferably of the Gerotor type, designated by the numerals 235, 236 and 237. The internal rotors of the Gerotor pumps are mounted on a common shaft 238 having a spur gear 241 affixed thereto. The spur gear 241 is driven by the spur gear 213 through an idler gear 242. The center section of the accessory gear box housing carries an oil filter 243, which can best be seen by reference to FIG. 7.

FIG. 15 shows an enlarged view of the three Gerotor pumps 235, 236 and 237, and also discloses inlet conduits 244, 245 and 246 to these Gerotor pumps. Engine lubricating oil is received by the Gerotor pump 237 from the inlet 246 and is discharged to an outlet conduit 247. The connection of the outlet 247 to the remainder of the lubricating system will be described at a later point in the specification. A pressure relief valve 248 is provided in the outlet conduit 247 to prevent unduly high pressures from being developed in the pump 237. The Gerotor pump 236 receives oil from the inlet conduit 245 and the Gerotor pump 235 receives oil from the inlet conduit 244. Oil is discharged from these two pumps into chamber 251 in the accessory gear box housing (FIG. 14). The oil from the chamber 251 then flows through an opening 252 into the bottom pan 200 of the accessory gear box housing where it is discharged into the cored opening in the low pressure spool housing 71 by means of the conduit 225, as was previously explained in connection with FIG. 7.

As previously discussed, the fan 16 is driven from the low pressure spool 51 and, accordingly, it forces an amount of cooling air through the intercoolers 14 and 15 which is directly proportional to the amount of air compressed by the low pressure compressor 11 and delivered to the intercoolers by the scrolls 12 and 13.

The fan 16 is completely enclosed, except for an opening at the top of the engine and the openings through the intercoolers, by structural parts of the engine and by sheet metal members 253 and 254 which are affixed to the fan housing members 139 and 140 by bolts 255 and 256 (see FIGS. 4 and 7). The sheet metal members are also fastened together by means of a series of bolts 257. As can be appreciated by an inspection of FIG. 7, the fan 16 also directs air upon the accessories positioned within the accessory gear box housing, the top of which is closed by a plate 258. Thus the fan 16, not only supplies cooling air for the intercoolers 14 and 15 but surrounds the oil filter 243, the combination starter-generator 231 and engine oil pumps 235, 236 and 237 with cool air.

Referring now to FIG. 8, the high pressure spool housing 182 supports a labyrinth seal 261 and the scroll 36 for the high pressure spool turbine 35 by means of a plurality of radial pins, one of which is designated by the numeral 262. The labyrinth 261 prevents an interflow between the compressed air compressed by the compressor 22 and the gases flowing through the turbine 35. A shroud 263 is supported from the high pressure spool housing 182 and the scroll structure 23 by means of a plurality of pins, one of which is shown at 264. A diffuser structure 265 for the compressor 22 is sandwiched between the scroll 263 and the labyrinth seal structure 261. An inlet shroud 265 for the high pressure spool turbine 35 is supported from the labyrinth seal structure 261. The cylindrically shaped diffuser 38 for the high pressure spool turbine 35 is threaded into the rear housing 191 of the machine at 266. A sliding fluid tight connection between the shroud 265 and the diffuser 38 is provided by means of two piston rings 267 and 268 positioned in grooves in the diffuser 38 and engaging a cylindrical wall of the shroud 265.

As previously described, heated air from the recuperator structures 26 and 27 is supplied to the primary burner 31 by means of conduits 32 and 33. The primary burner 31 includes a housing 271 affixed to the rear housing 191 of the gas turbine engine, and an inner burner can or flame tube 272, shown in outline form. It is understood that the burner can or flame tube 272 is conventional in structure, and includes a plurality of holes which have not been shown in the drawing. The burner can or flame tube 272 is connected to an extension 273 of the scroll 36 by means of an intermediate structure, generally designated at 274. An end view of the primary burner 31 is shown in FIG. 16. Fuel is supplied from a fuel source to the burner nozzle 34 (shown in FIG. 8), which may be of the recirculating type, by means of a conduit 275. Conduit 276 carries the unused fuel from the burner nozzle 34 back to the fuel source. An igniter 277 extends through the wall of the housing 271 and the wall of the burner can or flame tube 272 to ignite the fuel-air mixture present in the burner when the engine is started.

The exhaust gases from the high pressure spool turbine 35 are delivered to a secondary or reheat burner, generally designated by the numeral 37 through the cylindrical conduit 38. The reheat burner 37 is shown in sectional view in FIG. 12, and is supported in portion 192 of rear housing 191 by means of a cover plate 281 which is secured to the portion 192 of the rear housing by a plurality of bolts, designated as 282 in FIG. 17. As can be seen by reference to FIG. 12, the reheat burner includes a burner can or flame tube 283 and an outer casing 284. It is understood that the burner can or flame tube 283 includes a plurality of holes which have not been shown in the drawing. FIG. 17 shows an end view of the secondary or reheat burner 37 including the supporting plate 281 and the bolts 282. Fuel is supplied from a fuel source to the nozzle of the reheat burner, which may be of the recirculating type, through a conduit 285. Fuel may be returned from the nozzle to the fuel source through a conduit 286. An igniter, designated by the numeral 287, extends through the supporting plate 281 and the burner can or flame tube 283 into the central portion of the burner. This igniter may be either of the electric glow plug type or the catalytic type, since the gases received by this burner have already been heated by the primary burner and are at a temperature considerably in excess of 900° F.

The casing 284 of the secondary or reheat burner 37 is affixed to the power turbine scroll assembly 42 by means of a joint, shown at 291. The turbine scroll assembly 42 supplies hot gases from the secondary or reheat burner 37 to the power turbine 41 through a nozzle assembly 43 (see FIG. 8). This structure will be explained in more detail in reference to FIGS. 19 through 22.

The portion 193 of rear housing 191 of the gas turbine engine receives a reduction gear box housing, generally designated by the numeral 301 which is bolted to the back of the rear housing by a plurality of bolts, one of which is shown in FIG. 8 at 302. These bolts engage threaded holes in the rear housing as shown at 303 in FIG. 12. This reduction gear box housing supports the power turbine 41 and its shaft, and the output shaft of the engine. Means, including a planetary gear train, are positioned between the power turbine shaft and the output shaft of the engine for providing speed reduction. This structure will be explained in detail in connection with FIGS. 19 through 22.

Figure 2:
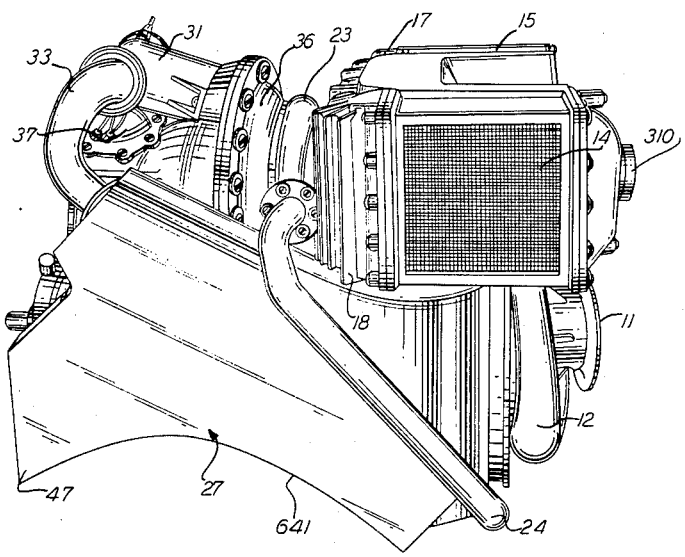
FIG. 2 is a side elevational view of the gas turbine engine of FIG. 1.

Referring now to FIG. 18 which is a sectional view taken along the lines 18—18 in FIG. 11, there is shown a drive means for an accessory pulley 310 which may be employed to drive engine accessories, such as, a power steering pump and a refrigerant compressor. In previous discussion in relation to FIG. 7, it was pointed out that a bevel gear 145 affixed to the fan shaft 95 of fan 16 meshed with a bevel gear 147 mounted on stub shaft 146, and that the stub shaft was mounted in fan housing member 139 by means of bearings 148 and 149. This stub shaft 146 and bevel gear 147 can be seen in FIG. 18. A sleeve 311 including a spur gear 312 is affixed to the shaft 146 for driving an intermeshing spur gear 313 affixed to shaft 314. The shaft 314 has affixed thereto the pulley 310. This pulley can be seen, in relation to the remainder of the engine, in FIGS. 1 and 2.

Referring again to FIG. 18, the shaft 314 is supported in fan housing member 139 by ball bearing 315 and by sleeve bearing 316.

Engine oil from the engine lubricating system, which will be described subsequently, is supplied to conduit 321. From conduit 321 engine oil under pressure is supplied to sleeve bearing 316 through conduits 322, 323, 324 and 325. Oil is supplied to bearing 149 from conduit 323 by means of conduit 326 and to bearing 148 from conduit 324 by means of conduit 327. Oil is supplied to bearing 315 by means of conduits (not shown) positioned within the housing 139. Oil from the bearings described above is returned to the sump 101 by means of conduit 331 positioned in fan housing member 139 and by conduits 332 and 333 positioned in fan housing member 139 and low pressure spool housing 71, respectively. Referring again to FIG. 18, it can be seen that the portion of the fan housing member 139 which supports the shaft 314 and pulley 310 extends through the sheet metal member 253 which encloses the fan 16. For this purpose there is provided a collar 341 which receives the sheet metal member 253 in an annular groove 342, and which receives in a bore 343 the portion of the fan housing member 139 that supports the shaft 314 and pulley 310.

Referring now to FIG. 19, there is shown an elevational view of the reduction gear housing 301 for the gas turbine engine of the present invention. The reduction gear housing supports bearing carrier 411 in which the output shaft 412 of the engine is rotatably supported.

Referring specifically to FIG. 20, the power turbine 41 includes a shaft 416 which is rotatably supported in the reduction gear housing 301 by means of a pair of anti-friction thrust bearings 417 and 418 and a sleeve bearing as will be described subsequently. The outer races of these bearings engage the housing 301 and are retained therein by means of a bearing retainer 419 which engages the outer race of bearing 418 and positions the outer race of bearing 417 against shoulder 420 of the housing. The bearing retainer is secured to the housing 301 by means of a plurality of screws, one of which is shown at 421. A sleeve 422, surrounding the shaft 416 and keyed thereto by means of a key 423, is forced against the inner race of the bearing 418 by means of a nut 424 threaded onto the shaft 416 which in turn forces the inner race of bearing 417 against a shoulder on shaft 416. The force of the nut is transmitted to the sleeve by means of washers 425 and 426. The power turbine 41 and the shaft 416 are thus rotatably supported in the housing 301 and are positively positioned axially in the housing 301 by the above described structure.

A turbine nozzle support member 427 having an axially extending boss 428 fitting into a bore 431 in the housing 301 is positioned over the end of the housing 301 and is affixed thereto by means of a plurality of screws 432. A sleeve type bearing 443 positioned between the turbine nozzle support member 427 and shaft 416, aids the bearings 417 and 418 in rotatably supporting the power turbine 41 and shaft 416 in the housing 301.

The turbine nozzle assembly generally designated by the numeral 43, including a plurality of blades 435 supported from an outer platform 436 and an inner platform 437 having an inner peripheral dimension or diameter greater than the outer peripheral dimension of the main body portion 438 of the nozzle support member 427, is supported from the nozzle support member by a plurality of radial pins 441. These radial pins pass through bores 442 in the inner platform 437 of the turbine nozzle, through the annular space between the inner platform 437 and the main body portion 438 of the turbine nozzle support member and into bores 443 in the main body portion 438 of the turbine nozzle support member 427. The bores 442 in the inner platform of the turbine nozzle and the bores 443 in the main body portion 438 of the turbine nozzle support are made slightly larger than the diameter of the pins 441 so that the pins engage these two members in a sliding fit relationship. The radial outward movement of the pins is limited by the turbine scroll assembly as shown. The radial pins 441 thus position the turbine nozzle concentrically with respect to the shaft 416 but permit the turbine nozzle 43 to expand and contract radially during different operating conditions through sliding action on the radial pins.

A plurality of heat shields, preferably three in number, designated by the numerals 444, 445 and 446, and having different diameters are positioned in the annular space between the inner platform 437 of the nozzle 43 and main body portion 438 of the nozzle support member 427. The outer dimension of the largest heat shield 444 is less than the inner dimension of the inner platform 437 while the inner dimension of the smallest heat shield 446 is greater than the outer dimension of the main body portion 438 of the turbine nozzle support member 427. Each of the heat shields has a plurality of bores represented by the numeral 447 for receiving the radial pins 441 which support the heat shields in spaced relationship with respect to the inner platform 437 of the turbine nozzle and the main body portion 438 of the nozzle support member. The radial pins also support the heat shields in spaced relation to each other. The heat shields are preferably formed of a material having a highly reflective outer surface for purposes which will be described subsequently. The material employed is preferably stainless steel such as SAE30321 or 30347.

A seal retainer 451, having an axially extending flange 452 positioned in a bore 453 in the turbine support member 427, is secured to the turbine support member by means of the screws 432 previously mentioned. The seal retainer has an axially extending flange 454 extending toward the power turbine 41 for carrying a sleeve 455 which surrounds a labyrinth seal 456 affixed to the shaft 416. The seal retainer 451 extends radially outwardly to a position approximately co-terminus with the outer periphery of the inner platform 437 of the turbine nozzle and forms an anular space together with a radially extending flange 457 on the turbine nozzle support member for receiving heat shields 444, 445 and 446 and the inner platform 437 of the turbine nozzle.

A cooling air seal 461 is positioned against the seal retainer 451 by means of the screws 432. This cooling air seal has a radially inwardy extending flange 462 which engages the axially extending flange 454 of the seal retainer 451 to properly position the arm 463 of the seal with respect to the power turbine 41.

The tips of the blades 435 of the turbine nozzle 43 preferably lie in an imaginary cylinder as is apparent from an inspection of FIG. 21. A shroud 464 with a cylindrical portion 465 having an internal diameter slightly larger than the diameter of this imaginary cylinder is positioned over the tips of the nozzle blades so that the cylindrical portion of the shroud surrounds the tips of the nozzle blades in a loose fit relationship. A portion 466 of the shroud extends axially and radially outwardly from the cylindrical portion 465 in spaced relationship over the tips of the blades 467 of the power turbine. Enough clearance is provided between the tips of the nozzle blades 435 and the cylindrical portion 465 of the shroud to permit differential radial expansion between these two members without setting up undue stresses in the shroud or the nozzle. This prevents warping of the shroud and maintains the concentricity of the shroud with respect to the tips of the turbine wheel blades during all operating conditions of the engine. For example, approximately .001" clearance may be provided between the tips of the nozzle blades 435 and the cylindrical portion 465 of the shroud around the entire circumference thereof for a nozzle approximately 8 inches in diameter.

The turbine scroll assembly 42 comprises a shroud retainer 471, having a radially outwardly extending flange 472, and a scroll 473 also having a radially outwardly extending flange 474. The radially outwardly extending flanges 472 and 474 are fastened together by suitable means such as bolt and nut assemblies shown at 475.

The shroud retainer 471 extends in spaced relation over the shroud 464, and has a radially inwardly extending flange 476 which fits over one end of the shroud and limits axial movement of the shroud in this direction. A small clearance is provided between the end of the shroud and the flange 476 so that stresses will not be set up in the shroud when the engine is operating at high temperatures. The shroud retainer 471 engages a portion of the outer periphery of the shroud as at 477 in a loose fit relationship, for example a few thousandths of an inch clearance is provided when the engine is cold, and this positions or pilots the turbine scroll assembly in the engine since the turbine scroll assembly is free to move radially and axially at other positions where it comes into engagement with the housing or other components of the engine as will presently be explained. The radially extending flange 474 of the scroll is supported by a radially inwardly extending flange 478 of the portion 193 of the rear housing 191 through the studs 481 and nuts 482. The bores 480 in the portion 193 of housing 191 that receive the studs 481 are made considerably larger than the diameter of the studs and the nuts are torqued to a predetermined value to permit sliding between the faces of the flanges 474 and 478 which are machined to reduce friction. This permits the turbine scroll assembly which operates at considerably higher temperatures than the housing to grow radially as the turbine scroll assembly rises in temperature and to contract radially when the temperatures are lowered.

The scroll 473 also has an axially extending flange 483 which aids in supporting the main portion of the scroll through radially inwardly extending flange 484. The axially extending flange 483 surrounds a portion of the housing 301 which supports the bearings 417 and 418, the power turbine 41 and shaft 416. The flange 483 is supported by the housing through a pair of piston rings 485 and 486 thereby permitting freedom of movement of the scroll assembly at this position and providing a seal to prevent leakage of the hot combustion gases. This construction also permits liberal machining tolerances between the housing and the scroll.

Lubricating oil is conveyed to the housing 301 from the lubrication system of the engine, which will be described subsequently, by way of a conduit 491 which is threaded into the housing at 492. From the conduit 491 lubricating oil is supplied to the bearing 433 via conduits 493, 494 and 495, oil transfer tube 496 and groove 497. Lubricating oil is similarly supplied to the bearings 417 and 418 via conduits 493, 498, 501, 502 and 503.

A planetary reduction gear train generally designated by the numeral 504 and shown in FIGS. 8 and 20 is employed to reduce the speed of the power turbine shaft 416 so that usable speeds, to drive a load, such as a motor vehicle, are available at the output shaft 412. This gearing is lubricated with oil flowing through the conduits 493, 505 and 506. The lubricating oil used in the lubrication of the bearings 417, 418 and 433 and the gear train 504 falls to the bottom of the housing 10 and may be scavenged through the bore 507 by means of conduit 508 affixed to the bottom of the reduction gear housing as shown in FIG. 3.

Cooling air for the power turbine 41, the turbine nozzle 43 and the heat shields 444, 445 and 446 is supplied to the housing 301, through conduit 511, from a source which will be described subsequently. Referring now to FIG. 22, it can be seen that the air supplied from the conduit 511, flows through conduits 512 and 513 in the housing, through air transfer tube 514 positioned between the housing and the turbine nozzle support member 427, through bores 515 and 516 in the turbine nozzle support member into the space between the inner platform 437 of the turbine nozzle and the main body portion 438 of the turbine support member. The cooling air leaves this space via a plurality of air transfer tubes, one of which is shown at 517 in FIG. 20. Cooling air under pressure fills the entire space between the inner platform of the turbine nozzle and the main body portion of the turbine support member as the cross sectional area of all the air transfer tubes 517 is less than the cross sectional area of the inlet bore 516. From this space the cooling air flows through the air transfer tubes 517 into the space defined by the power turbine 41 and the cooling seal 461 where it is maintained at a pressure approximately 1 p.s.i. above the gas flowing through the nozzle 43 and past the turbine blades 467. From this space the cooling air flows out into the gas stream through the restricted flow path defined between the power turbine 41 and the arm 463 of the cooling air seal 461. Cooling air also flows through the labyrinth seal 456 into the space between the nozzle support member 427 and the seal retainer 451 thereby preventing any lubricating oil from leaking through the labyrinth seal. From this space, the cooling air flows through the bore 518 in the nozzle support member 427 into the housing 301 where it may be exhausted through a breather in the housing as shown at 519 in FIG. 3. By maintaining the pressure of the cooling air in the space between power turbine 41 and the cooling seal 461 slightly above that of the combustion gases, the gases are prevented from flowing through the labyrinth seal 456 thus preventing hot combustion gases from reaching the bearings 433, 417 and 418.

As can be appreciated by the above description and by reference to the drawings, the cooling air not only cools the center of the power turbine 41 to prevent overheating of the turbine wheel and of the shaft 416, but also serves to remove heat from the heat shields 444, 445 and 446, the radial pins 441, the turbine nozle 43 and the turbine nozzle support member 427 to prevent the bearing 433 from becoming overheated because of the heat from the nozzle 43. As previously pointed out, the heat shields are constructed of a material having highly reflective surfaces such as stainless steel. These highly reflective surfaces tend to reflect the heat emanating from the turbine nozzle 43, particularly inner platform 437 thereof, and thereby aid in preventing turbine nozzle support member 427 and bearing 433 from becoming overheated. The reflection of the heat radiated from the inner platform 437 of the turbine nozzle back against the undersurface thereof prevents a large thermal gradient across the inner platform thereby preventing overstressing and cracking.

The subject matter shown in FIGS. 19 through 21 and described in connection with these figures is also disclosed in copending application S.N. 820,323 entitled Gas Turbine Engine filed June 15, 1959, now Patent No. 3,045,966, in the name of Ivan M. Swatman and assigned to the assignee of this application.

The panetary reduction gear train 504 includes a sun gear 531 formed integrally with the sleeve 422 which is keyed to power turbine shaft 416 by means of key 423 (see FIGS. 8 and 20). The sun gear drives a plurality of planet gear assemblies, one of which is shown at 532. Each of the planet gear assemblies includes a first gear 533 engaging the sun gear 531 and a second gear 534 engaging a ring gear 535. Each of the planetary gear assemblies is mounted on a shaft of a planet carrier, designated by the numeral 536. These shafts, which are designated by the numeral 537, are hollow in configuration and carry sleeve bearings 541 and 542 for rotatably supporting the planet gear assemblies 532. The planet carrier 536 is rotatably supported in the bearing carrier 411 by means of a ball bearing 543.

Lubricating oil for the bearings 541 and 542 is supplied from the conduit 505 through conduit 506, conduit 507, 508 and the hollow shaft 537 of the planet carrier. Lubricating oil for the bearing 543 is also supplied from the conduit 506 through a conduit (not shown) drilled in the bearing carrier 411. As previously mentioned, oil from the bearings 433, 417 and 418 is collected in the bore 507. Oil from the bearings 541, 542 and 543 is also collected in the bore 507 where it is returned to the oil pumps of the engine lubricating system through conduit 508, shown in FIG. 3.

From the power turbine 41, the gases supplied by the reheat burner 37 expand through the two-stage low pressure turbine 44 which includes turbine rotors 52 and 53. The turbine rotors 52 and 53 are surrounded by a shroud structure which is adjustably supported from the outer casing 130 of the low pressure spool.

This structure is shown in more detail in FIGS. 23 through 25. FIG. 23 shows the shroud and interstage nozzle assembly for the two-stage low pressure turbine 44. This assembly comprises a first shroud 561 surrounding the tips of the blades of turbine wheel 53 and a second shroud 562 surrounding the tips of the blades of turbine wheel 52. The interstage nozzle ring 54 is positioned in suitably machined grooves in the shrouds 561 and 562 and is carried by the shrouds 561 and 562 in an internesting relationship so a smooth flow path is presented to the motive fluids operating the turbines. The nozzle ring 54 carries a labyrinth seal 564 which is affixed thereto by means of rivets 565. This labyrinth seal is positioned around the hub 566 of the turbine wheel 52 to prevent any passage of the motive fluid between the turbine wheels 52 and 53 except through the nozzle area of the nozzle ring. A dowel pin 563 is provided between the shroud 562 and the outer portion of the nozzle ring 54 to resist any tendency toward relative rotation between these two parts due to rotation of the hub 566 of turbine wheel 52 with respect to the labyrinth seal 564. Each of the shrouds 561 and 562 has a radially outwardly extending flange designated by the numerals 567 and 568 respectively, and which are positioned in abutting relationship. The shroud member 561 has a generally cylindrical portion 571 which lies around a portion of interstage nozzle ring 54 and the shroud 562, and connects the outwardly extending flange 567 with the portion of the shroud which is positioned around the turbine wheel 53.

As can best be seen by reference to FIGS. 24 and 25, each of the annular flanges 567 and 568 has a plurality of bores 573 positioned therein. A dowel pin 572 is provided to properly align these bores and the notches in the flanges 567 and 568 which will be described below.

Referring again to FIG. 23, a bushing 570 having a main body portion 574 of smaller external diameter than the bore 573 and having an outwardly extending flange 575 is provided for each of the bores 573 so that the main body portion thereof is positioned in the bore. A bolt 576 is positioned in the bushing and passes through a bore 577 in the low pressure spool casing 130 and through a bore 578 in an annular flange member 579. A nut 581 is provided to complete this assembly for securing the shroud and interstage nozzle assembly to the casing 130. The length of the main body portion 574 of the bushing is made slightly longer than the combined width of the flanges 567 and 568 of the shrouds 561 and 562. This provides a loose fit for the shroud assembly so that when the nuts 581 are tightened in relation to the bolts 576 the shroud assembly will be held in approximate position but will be free to move within a restricted space.

A plurality of eccentric adjusting mechanisms, generally designated by the numerals 582, 583, 594, 585, 586 and 587 are provided for properly positioning the shrouds 561 and 562 over the tips of the blades of the turbine wheels 52 and 53 and for properly positioning the labyrinth seal 564 with respect to the hub 566 of the turbine wheel 52. The structure of these eccentric adjusting mechanisms can be readily understood by references to FIGS. 3 and 4. Each of these comprises a pin 591 which is positioned in a bore 592 in casing member 130 and is secured therein by means of a transverse pin 593. Positioned over the pin 591 is an eccentric bushing 594 which has a hexagonal portion 595 at one end thereof. An adjusting block 596 fits over the eccentric bushing 594 and is positioned in a notch 597, preferably of rectangular configuration in the outwardly extending flanges 567 and 568 of the shrouds 561 and 562. A nut 598 and washer 601 are provided to fit over the end of the pin 591. When the nut is tightened down against the washer it secures the eccentric bushing 594 against rotation.

As previously mentioned, the shroud and interstage nozzle assembly is loosely secured in the approximate position by means of the bolts 576 and nuts 581 in co-operation with the bushings 570. The eccentric adjusting mechanisms may then be employed to precisely align the shrouds with relation to the turbine wheels. Three of these eccentric adjusting mechanisms are preferably employed and are selected so that they are 120 degrees apart around the periphery of the shroud assembly. For example, eccentric adjusting mechanisms 582, 584 and 586 may be employed, with the eccentric adjusting mechanisms 583, 585 and 587 to be placed in position after the adjustment is completed. It can be readily appreciated that by the rotation of the eccentric bushings 594 of the eccentric adjusting mechanisms 582, 584 and 586 that the shrouds 561 and 562 may be properly positioned over the tips of the turbine blades of turbine wheels 53 and 52 so that the spacing between each of the turbine blade tips of turbine wheel 53 and shroud 561 is equal and so that the spacing between each of the turbine blade tips of turbine wheel 52 and shroud 562 is equal. The rotation of the eccentric bushings can be readily accomplished by use of a wrench placed in engagement with the hexagonal portion 595.

By reference to FIGS. 24 and 25 it can be seen that a space is provided between the bottom of each of the adjusting blocks and the bottom of the notches 597. From this it is apparent that each of the eccentric adjusting mechanisms is effective for moving the center of the shroud mechanism in a direction parallel to the bottom of the notch of the particular adjusting mechanism being manipulated. Since three of these eccentric adjusting mechanisms spaced 120 degrees apart around the shroud mechanism in a direction parallel to the shroud assembly can be moved to any desired location within the limits of the eccentricities of the eccentric bushings 594. When the adjustment is completed the nuts 598 of each of these eccentric adjusting mechanisms is tightened down against the washer 601 and the eccentric bushing so that the bushings are secured against any further rotation. The eccentric adjusting mechanisms 583, 585 and 587 may then be slipped into place and securely tightened. Although only three eccentric adjustment mechanisms are necessarily to properly align the shroud assembly with relation to the turbine wheels, it is preferred to employ six of these mechanisms. It is apparent that the casing 103 to which the pins 591 are affixed is well insulated from the exhaust gases in the diffuser 45 and that, therefore, the spacing between these pins will remain relatively constant, while the shroud assembly which is subject to severe temperature differentials will expand and contract in relation thereto. This phenomenon has a tendency to cause flat portions to develop between the pins in the otherwise annular shroud structures, and by providing six pins and adjusting mechanisms rather than three the amount of deviation from the annular condition is minimized.

Since the blocks 596 are positioned in the notches 597 in a loose fit relationship and a space is provided between the bottom of the blocks and the bottom of the notches the whole shroud assembly is permitted to expand and contract in a radial direction as the operating temperature of the engine changes. This expansion and contraction is also permitted because of the loose fit employed with the bushing 570, the bolt 576 and the nut 581. Thus the adjustment provided by the eccentric adjusting mechanisms will remain during any operating condition of the engine.

The structure shown in FIGS. 23 through 25 and described in relation to these figures is also disclosed in copending application S.N. 775,825 entitled Gas Turbine Engine filed November 24, 1958, now Patent No. 3,062,497 in the names of Benjamin T. Howes and Ivan M. Swatman and assigned to the assignee of this application.

It can be readily appreciated by an inspection of FIGS. 7 and 8 that the low pressure spool including low pressure spool compressor 11, shaft 51 and low pressure spool turbine 44, is axially aligned with the power turbine 41 and its shaft 416, as well as with the output shaft 412 which is affixed to the planet gear carrier 536.

Referring now to FIGS. 7, 8 and 10, it can be seen that the exhaust gases from the two-stage low pressure turbine 44 expand into diffuser 45. The diffuser 45 includes an inner sheet metal member 621 which surrounds the low pressure spool shaft 51 and the portion of the low pressure spool housing 71 which supports the shaft 51. The inner sheet metal member is welded or otherwise suitably affixed to a sleeve 622 which surrounds the bearing carrier 70. The bearing carrier 70 is provided with piston rings 623 and 624 which engage the sleeve 622 so that relative movement between the sleeve and the bearing carrier is permitted. The inner sheet metal member 621 is insulated from that portion of the low pressure spool housing 71 which supports the shaft 51 by means of blankets of insulating material, designated by the numeral 625. The insulating material prevents heat transfer between the exhaust gases in the diffuser 45 and the bearings 72 and 73 which support the low pressure spool shaft.

The diffuser 45 also includes an outer sheet metal member 626 which is welded or otherwise suitably secured to a flange member 579 which in turn is secured to the low pressure spool casing 130 by means of the bolts 576 and the nuts 581. The outer sheet metal member 626 may move relative to the low pressure spool casing 130 through a sheet metal shoulder affixed thereto at 627 which engages in sliding relationship an inwardly extending flange 628 of the casing 130. Insulating material 631 is also positioned between the outer sheet metal member 626 of the diffuser 45 and the casing member 130 to prevent large expansions and contractions of the casing member. The inner sheet metal member 621 and the outer sheet metal member 626 are generally cylindrical in shape so that the diffuser 45 surrounds the low pressure spool shaft 51 and the portion of the low pressure spool housing 71 which supports the shaft. At the end of the diffuser, adjacent the low pressure compressor 11, there is provided a pair of radially outwardly extending conduits, generally designated by the numerals 635 and 636, which can best be seen by reference to FIGS. 6 and 10.

Referring to FIG. 8, it can be seen that insulating material is also positioned about the reheat burner 37, the power turbine scroll 42 and between the shrouds for the low pressure turbine and the power turbine and the portion 193 of rear housing 191. In the interest of clarity this insulating material has been omitted from FIGS. 6, 12 and 20.

Referring now to FIG. 26, there is shown the structure of one of the recuperators which have been designated by the numerals 26 and 27. The recuperator structure includes a casing element 641 which has an inlet 642 for the exhaust gases from the diffuser 45. The casing 641 bolts onto the low pressure spool casing member 130 at a position designated by the numerals 643 and 644 (FIG. 10). The matrix or the heat exchanger element per se of the recuperators 26 and 27, is shown generally at 645. The matrix or heat exchange element 645 is composed of a plurality of alternate elements of sheet metal members which are suitably brazed together. These alternate elements are shown in FIGS. 27 and 28 respectively.

Referring now to FIG. 27, there is shown an element or channel which conveys compressed air from the high pressure compressor 22 through the recuperator to the primary burner 31. The matrix 645 has a pair of conduits which are half cylindrical in configuration, designated by the numerals 646 and 647. These conduits are positioned in slots 648, 651, 652 and 653 which are cut in the sides of the matrix element, and are brazed to the matrix element. Each of the conduits has an end piece affixed thereto, one of which is shown at 654.

The passageway for the compressed air from the high pressure compressor 22 includes the conduit 25 which connects the recuperator with the high pressure compressor, the conduit 647, a passageway 655, a corrugated sheet metal member 666, which has corrugations which run in the vertical direction in viewing FIG. 27, a passageway 667 and the conduit 646. The heated air is then conveyed to the primary burner through the conduit 32 which is suitably affixed to the matrix element 645. The path through the recuperator for the exhaust gases which enter the casing 641 from the diffuser 45 includes a channel 671 over the top of the recuperator, as viewed in FIGS. 26 and 28, sheet metal member 672, having a plurality of vertical corrugations and the exhaust conduit 46. The channels 655 and 667 which connect the corrugated sheet metal member 666 with the conduits 646 and 647 may contain triangular corrugated sheet metal elements 675 and 676. These triangular sheet metal elements insure equal flow distribution through the corrugated sheet metal elements 666.

The matrix element 645 is mounted within the casing 641 which includes a pair of seal supports 681 and 682 affixed to the inner portion of the casing. Each of these supports has a longitudinal spring element 683 which carries a seal 684 for engaging the conduits 646 and 647 to prevent any gas leakage between the matrix element 645 and the recuperator casing 641. The matrix element 645 is removably mounted within the casing, and as shown in the exploded view of FIG. 26, has a plate 691 affixed to one end thereof adjacent the conduit 25. The connection between the conduit 25 and the half cylindrical conduit 647 may be made by any conventional means.

The connection between the conduits 25 and 647, including the positioning of the end plate 691, as shown, is made before the matrix element 645 is positioned within the casing. After the element is positioned within the casing the plate 691 is bolted to the casing and the connecting elements, including end plate 692, sleeve 693, piston ring 694 and clamp 695, are positioned to affix the other end of the matrix element to the casing. The plate 692 is then bolted to the casing at 696. The matrix elements 645 may be removed from the engine at any time for cleaning and repair by removing the bolts which affix the plates 691 and 692 to the casing 641 and by removing clamp 695 and sleeve 693.

The recuperator or heat exchanger described is of the cross-counter flow type, since the air flowing in passageways 655 and 667, and through triangular corrugated sheet metal members 675 and 676, flows substantially perpendicularly to the exhaust gases flowing in the corrugated section 672, and the air flowing in the corrugated passageway 666 flows substantially parallel to the gases flowing in corrugated passageway 672 but in the opposite direction.

Referring now to FIGS. 29 through 31, there is shown an alternate means for driving engine accessories, such as, a power steering pump and a refrigerant compressor. FIG. 29 shows, in elevational view, an automatic transmission 701 which is coupled to the output shaft of the gas turbine engine. Referring now to FIG. 30, there is shown a planet carrier 536, which is connected to a shaft 702 by means of splines 700. The shaft 702 is connected to torque converter element 703 of the automatic transmission 701 through a plate 704 and a plurality of bolts, certain of which are shown at 705 and 706. A housing 711 is affixed to the reduction gear housing 301 of the gas turbine engine and to the automatic transmission 701 by conventional means (not shown). A refrigerant compressor 712 is mounted upon the housing 711 by means of bolts 713 and 714. A power steering pump 715 is mounted upon the automatic transmission housing by means of a bracket 716 and bolts 717 and 718. The bracket has a slot at 721 so that the tension of the belts interconnecting the power steering pump, the refrigerant compressor and the driving gear, which drives these two accessories, may be suitably adjusted.

The bearing carrier 411, which supports the bearing 543, has a gear housing 721 affixed thereto by a plurality of bolts, one of which is shown at 722. This gear housing is longitudinally split and includes a second section 723 secured to the member denoted by the numeral 721 by a plurality of bolts, one of which is shown at 724. The planet carrier 536 has a spur gear 727 affixed thereto for driving another spur gear 728 which is rotatably supported in the gear housing members 721 and 723 by bearings 731 and 732. The spur gear 728 includes a shaft 733 which carries a driving pulley 734.

The refrigerant compressor 712 carries a pulley 741 connected to shaft 742, and the power steering pump 715 carries a pulley 743 connected to shaft 744. A pair of belts, designated by the numerals 751 and 752, extend around the pulleys 734, 741 and 743 so that the refrigerant compressor 712 and the power steering pump 715 are driven by the output mechanism of the gas turbine engine, the planet carrier 536.

Referring now to FIG. 32, there is shown a diagrammatic illustration of the lubrication system of the gas turbine engine of this invention. The lubrication system is provided with a main sump 101, which is shown in cross section in FIG. 7, and a pair of auxiliary sumps, one of which is designated by the numeral 104, as shown in FIG. 8, for scavenging the low pressure spool shaft bearing 72. The other auxiliary sump, designated by the numeral 507, and shown as a bore in FIG. 20, scavenges the power turbine bearings 417, 418 and 433, and the bearings and gearing mechanism of the reduction gear train including sun gear 531 and planetary gear assemblies 532.

The Gerotor pump 235 shown in FIGS. 14 and 15, is connected to the bore or sump 507 by means of the line 508 shown in FIG. 3 and the inlet conduit 244 shown in FIG. 15. The Gerotor pump 236 is connected to the auxiliary sump 104 through the pipes 105, 106 and the bore 107 in the low pressure spool housing, shown in FIGS. 7 and 8, and by the inlet conduit 245 to the pump shown in FIG. 15. As previously pointed out in the discussion of FIGS. 14 and 15, the pumps 235 and 236 discharge into chamber 251 located in the side of accessory gear box housing 196. The chamber 251 empties into the lower part of the accessory gear box housing through the opening 252. The oil in the bottom of the accessory gear box housing 196 is then returned to the main sump 101 through the interconnecting conduit 225 which connects the accessory gear box housing 196 with the low pressure spool housing 71 and through the cored openings in the low pressure spool housing. The sump 101 is connected to the Gerotor pump 237 through a check valve 771, shown in FIG. 7, a pipe 772 secured to the low pressure spool housing 71, and drilled conduits 773 and 774 in the low pressure spool housing.

Referring now to FIG. 11, there is shown an external conduit 775 which is connected to the drilled conduit 774 in the low pressure spool housing at a point above the low pressure spool and to the inlet conduit 246 for the Gerotor pump 237.

Lubricating oil from the Gerotor pump 237 is discharged into the opening 247 which is connected to a filter 243 by means of a line 781, shown in schematic form in FIG. 32. As the oil is filtered it is delivered to an oil cooler 782 which is connected to the output of the filter by means of a conduit 783 which can be seen by reference to FIG. 7. The oil cooler 782 may be positioned to receive cooling air from the intercooler fan 16.

The pressure relief valve 248, shown in FIG. 15, is connected with the discharge openings from Gerotor pumps 235 and 236, and in case excessive pressures are built up in the pump 237, this valve will open and discharge part of the output into the chamber 251 in the accessory gear box housing 196. A portion of the oil from the oil filter bypasses the oil cooler 782, and is directed onto the point where the bevel gears 208 and 211 intermesh by means of conduit 784. The cooled oil from the oil cooler is delivered into a manifold 791, as shown in FIG. 11, from a conduit 792 which may be connected to the oil cooler by means of an oil line not shown. From the manifold 791, oil is delivered to lubricate the low pressure spool bearings 72, 73 and 74 by means of a conduit 793 and the drilled conduit 75 in the low pressure spool housing 71. The conduit 75 can be seen by reference to FIG. 10. From the conduit 75 oil is delivered under pressure to the bearings 72, 73 and 74 through the conduits previously described in connection with the description of FIGS. 7, 8 and 10.

Oil under pressure is also delivered to the conduit 491, as shown in FIGS. 3, 8 and 20, by means of the conduit 793 and a conduit 794 which is partially shown in FIG. 11. The path of the oil from conduit 491 to the bearings and gears of the power turbine and the reduction gear train has been described previously in connection with FIGS. 8 and 20.

Oil under pressure to lubricate the bearings 142, 143 and 143' of the fan shaft 95 is delivered to these bearings from the manifold 791 through a conduit 798, a portion of which is shown in FIG. 11. This conduit connects with the manifold 791 and feeds oil under pressure into the conduit designated by the numeral 151 in FIG. 7 and into the conduit 162 as shown in FIG. 9. The path of the oil from the conduits 153 and 162 to the bearings 142, 143 and 143' has been previously described in connection with the description of FIGS. 7 and 9.

Oil under pressure is supplied to the high pressure spool bearings 206 and 207 through a conduit 801 (see FIG. 11) which is connected to the manifold 791 and is partially shown in FIG. 11. The conduit 801 is connected to supply oil under pressure to the opening 216, as shown in FIG. 7, in the accessory gear box housing 196. The oil is then supplied to bearings 206 and 207 as well as bearings 223 and 224 of the accessory gear box shaft 212 by means of the conduits shown in FIG. 7 and previously described. Oil under pressure is also supplied to the sleeve bearings supporting the idler gears 232 and 242 of the accessory gear box by means of a conduit 802 which conveys a portion of the oil flowing in conduit 801 to these bearings.

Check valves 78 and 771 are provided to prevent oil from draining into the sump 104 and the sump 101, respectively, when the engine is shut down. The check valve 771 is an ordinary ball type check valve which permits oil to flow upwardly through the conduit 774, but will prevent oil from flowing in the reverse direction. The check valve 78, on the other hand, is a valve which requires a certain amount of pressure to open it, and when the engine is shut down the pressure of the oil in the lines above the check valve is not sufficient to open it. These check valves insure adequate lubrication for all points in the engine from the moment the engine is started.

It is apparent from the description of the lubricating system for the gas turbine engine and from an inspection of FIG. 32, that the pumps 235 and 236 serve as scavenge pumps to pump the oil collected in auxiliary sumps 104 and 507 into the main sump 101. The pump 237 then pumps the oil from the main sump 101 to the various lubrication points in the engine.

The gas turbine engine is also provided with a centrifugal oil separator 791 as shown in FIGS. 4 and 7. The oil separator receives oil mist present in low pressure spool housing 71 by means of a conduit 792 and receives oil mist present in reduction gear housing 301 by means of breather conduit 519 (see FIG. 3) which connects to the conduit 792 as shown in FIG. 4. The oil separator may be powered by means of the oil mist which is at a pressure slightly above atmospheric or may be powered from a rotating shaft of the engine by suitable means (not shown). The separator delivers the separated oil into sump 101 while discharging air to the atmosphere through conduit 793 (see FIG. 7).

There is thus provided for the gas turbine engine of this invention an integrated lubricating system for all of the bearings supporting all of the various shafts in the engine and for the various gear sets employed. Additionally, there are provided strategically placed check valves which prevent the oil in the system from draining into the various collection points when the engine is at rest.

Referring now to FIG. 33, there is shown a diagrammatic illustration of the cooling air system for the gas turbine engine of the present invention. The cooling air for the low pressure spool turbine 44, for the bearing 72 positioned adjacent this turbine, and for one face of the power turbine 41 is taken from one of the ducts interconnecting the intercoolers 14 and 15 with the high pressure compressor 22. As can best be seen by reference to FIG. 11, a conduit 821 removes air from the duct 18 which interconnects intercooler 14 with the high pressure compressor 22. The air is delivered into a drilled conduit in the low pressure spool housing 71. A portion of this conduit is shown at 822 in FIG. 10. From the conduit 822 air under pressure is delivered to a chamber 823 in the bearing carrier 70 through conduits 824, 825, pipe 826 and conduit 827 in the bearing carrier 70. From the chamber 823 the air flows into a space 831 between a cooling air seal 832 and one face of the turbine rotor 52 through a plurality of holes positioned in the cooling air seal, one of which is shown at 833. The cooling air seal 832 has an arm extending therefrom which is in close proximity to the face of the turbine rotor 52 so that the flow of air from the chamber 831 is restricted. The air, however, does find its way through this seal into the path of the exhaust gases in the diffuser 45.

Cooling air is also supplied to the adjacent faces of the turbine rotor 53 of the low pressure spool turbine and the power turbine 41. The low pressure spool shaft 51 has a bore 850 positioned therein, and the bolt 55 which secures the turbine rotor 53 to the shaft 51 also has a bore 851 (see FIGS. 7 and 8). Cooling air is transferred into the bore 850 from the conduits 822 and 824 through conduits 852 and 853 (see FIG. 10). The conduit 853 is positioned in a portion of the sleeve 79. This portion of the sleeve 79 surrounds the shaft and includes a labyrinth seal 854, as shown in FIG. 7. The shaft at this point has an annular groove 855 and a plurality of radial bores, one of which is shown at 856, which connects the groove 855 with the center bore 850 in the shaft 51. The air under pressure then proceeds down the bore 850, the bore 851 in the bolt 55, and is forced onto the adjacent faces of the power turbine 41 and the turbine rotor 53 of the low pressure spool turbine. The air proceeds from the bore in the bolt 55 radially outwardly over the faces of these two turbines and then finds its way into the stream of gases flowing through the power turbine and the low pressure spool turbine.

Referring again to FIG. 33, cooling air is also supplied to a conduit 861 which is connected to the conduit 511 positioned in the reduction gear box housing 301 shown in FIGS. 3 and 22. This cooling air cools the bearing 433 and the face of the power turbine 41 adjacent the bearing 433 as previously described in connection with the discussion of FIG. 22. Since the gases flowing through the nozzle blades 435 and the power turbine blades 467 are at a higher pressure than the gases flowing through the low pressure spool turbine, the air supplied to the conduit 512 must be of higher pressure than that supplied to the conduit 821. Air is taken, therefore, from the scroll 23 of the high pressure compressor through a conduit 862, and is then cooled in a cooler 863 before proceeding to the conduit 861 (see FIG. 33). This cooler may be positioned between intercoolers 14 and 15 so as to receive air from the intercooler fan 16.

Referring now to FIG. 11, there is shown a portion of the low pressure spool in cross section including the outer casing 130. There may be provided with this invention a plurality of bearing support rods 901, 902 and 903, which engage a ring 904 positioned about the portion of the low pressure spool housing 71 which supports the shaft 51. The ring may be constructed of a plurality of sections which are fastened together by a plurality of pins as shown. The location of the rods longitudinally of the engine may be seen by reference to FIG. 8 in which the ring can be seen at 904. Referring again to FIG. 11, each of these rods has a flange 905 which engages the bottom of a bore 906 in the outer casing 130. Each bore is threaded to receive a nut 907. When the nuts 907 are loosened slightly the rods 901, 902, and 903 may be selectively rotated by means of the hexagonal head 908 to position the bearings 72 and 73, and consequently the low pressure spool shaft 51 and the turbine rotors 52 and 53 in a proper position with respect to the casing 130. After proper adjustment, the nuts 907 may be tightened down against the flange 905 and locked in position. This structure is more fully described in copending application S.N. 733,688 entitled Bearing Support Structure filed May 7, 1958, now Patent No. 3,002,793 in the name of Frank M. Burhans and assigned to the assignee of this application.

As was previously discussed, the gas turbine engine of the present invention is provided with a combination starter-generator 231 which is geared to the high pressure spool shaft 205 through spur gear 233, idle gear 232, spur gear 213, shaft 212 and bevel gears 211 and 208. When the engine is to be started the combination starter-generator 231 is energized and as a consequence the high pressure spool shaft is rotated at a high speed. The compressor 22 of the high pressure spool draws air through the low pressure spool compressor 11, through scrolls 12 and 13, through intercoolers 14 and 15, through ducts 17 and 18 and discharges compressed air into the scroll 23. From the scroll 23, the compressed air is conveyed to the primary burner 31 through ducts 24 and 25, recuperators 26 and 27 and ducts 32 and 33. Fuel is supplied to the primary burner 31 through nozzle 34, and in the presence of igniter 277, which is suitably energized, the fuel-air mixture is ignited thereby supplying motive fluid for the high pressure turbine 35, for the power turbine 41 and for the low pressure spool turbine 44. When the low pressure spool rotates, the low pressure spool compressor 11 compresses air to the supplied to the high pressure spool compressor 23 and the engine begins to operate under its own power. After a suitable period, the starter-generator is de-energized and the reheat burner 37 is energized.

The high pressure spool, including compressor 22 and turbine 35, rotates at approximately 91,500 r.p.m. at the rated power to the engine and at approximately 70% of this speed at idle. The high pressure spool thus offers an excellent power source for operating engine accessories and in the engine, as described, the generator and engine oil lubricating pumps are powered from the high pressure spool. Additionally, a power steering pump and a refrigerant or air compressor may be operated from the pulley 310 driven from the high pressure spool. The accessories can thus be made smaller than those which must be employed with piston engines or simple cycle gas turbine engines in which all of the shafts rotate over a wide speed range, between idle and full power.

The substantially constant speed feature of the high pressure spool is also largely instrumental in producing good fuel economy over a broad spectrum of loads and speed, and particularly provides an advantage over simple cycle, low pressure gas turbine engines, that of good part load fuel economy.

As can readily be appreciated from the foregoing description, the objective of symmetry of design has been achieved by the provision of the twin intercoolers 14 and 15, and by the provision of twin recuperators 26 and 27 positioned on either side of the engine, as well, as by the provision of other features disclosed.

Furthermore, the ducts which carry the high temperature gases in the engine including cylindrical duct 38, which connects the high pressure spool turbine 35 with the secondary or reheat burner 37, the power turbine scroll assembly 42, and the diffuser 45, are mounted within the engine so that relative movement can take place between these parts and adjacent parts upon which they are mounted. Also, suitable insulating material has been provided between these ducts and portions of the housings of the engine located adjacent thereto.

The present invention also provides a lubrication system and a cooling air system for the gas turbine engine of this invention.

A gas turbine engine constructed in accordance with the principles of this invention and having a power output of 300 horsepower at 100° F. weighs 650 lbs., including accessories and is 38 inches long, 29⅜ inches wide and 28⅜ inches high. With this size and weight the engine can easily be installed in the engine compartments of trucks and most passenger vehicles.

The present invention thus provides a gas turbine engine, suitable for use in an automotive vehicle, which has a high horsepower to weight ratio and which has good fuel economy over a broad spectrum of loads and speeds.

It will be understood that the invention is not to be limited to the exact construction shown and described and that various changes and modifications may be made without departing from the spirit and scope of the invention, as defined in the appended claim.

What is claimed is:

In a gas turbine engine, a housing, a low pressure spool including a low pressure spool compressor, a low pressure spool turbine and an interconnecting shaft rotatably mounted within said housing, a high pressure spool including a compressor and a turbine rotatably supported within said housing, a power turbine rotatably supported within said housing, a burner supported by said housing for supplying motive fluid to said turbines, said compressor of said high pressure spool having an outlet scroll, said low pressure spool turbine and said power turbine being positioned in axially aligned relationship and each having a first and a second face, the first faces of said low pressure spool turbine and said power turbine being positioned in spaced juxtaposed relationship, said shaft and said low pressure spool turbine having a longitudinal bore positioned therein terminating at said first face of said low pressure spool turbine, an intercooler, means connecting said low pressure spool compressor with said intercooler for delivering the effluent from said low pressure spool compressor to said intercooler, means connecting said intercooler to the compressor of said high pressure spool for delivering the effluent from said intercooler to the compressor of said high pressure spool, and means coupling said last mentioned means and the longitudinal bore in said interconnecting shaft for delivering cooling air under pressure to said longitudinal bore and to the first spaced juxtaposed faces of said power turbine and said low pressure spool turbine, conduit means connected to said means interconnecting said intercooler and the compressor of said high pressure spool for supplying cooling air to the second face of said low pressure turbine, a cooler, and means for delivering cooling air from said outlet scroll of said high pressure spool compressor to the second face of said power turbine through said cooler.

References Cited by the Examiner

UNITED STATES PATENTS

| | | | |
|---|---|---|---|
| 911,825 | 2/09 | Lentz | 60—39.16 |
| 2,372,686 | 4/45 | Sedille | 60—39.16 |
| 2,375,006 | 5/45 | Larrecq | 60—39.16 |
| 2,401,826 | 6/46 | Halford | 253—39.15 |
| 2,473,356 | 6/49 | Birmann | 230—116 |
| 2,584,899 | 2/52 | McLeod | 253—39.15 |
| 2,625,012 | 1/53 | Larrecq | 60—39.16 |
| 2,639,579 | 5/53 | Willgoos | 253—39.15 |
| 2,657,901 | 11/53 | McLeod | 253—39.15 |
| 2,669,092 | 2/54 | Hammaren | 60—39.16 |
| 2,680,001 | 6/54 | Batt | 253—39.15 |
| 2,788,951 | 4/57 | Flint | 253—39.15 |
| 2,802,334 | 8/57 | Fletcher | 60—39.16 |
| 3,023,577 | 3/62 | Williams | 60—39.16 |

SAMUEL LEVINE, *Primary Examiner.*

LAURENCE V. EFNER, ABRAM BLUM, *Examiners.*